United States Patent
Woods et al.

(10) Patent No.: US 12,546,424 B1
(45) Date of Patent: Feb. 10, 2026

(54) FLUID COUPLER WITH POSITIVE ENGAGEMENT INDICATOR

(71) Applicant: Mainstream Engineering Corporation, Rockledge, FL (US)

(72) Inventors: Benjamin S. Woods, Melbourne, FL (US); Tyler A. Pozarycki, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 18/953,178

(22) Filed: Nov. 20, 2024

(51) Int. Cl.
  *F16L 37/088*  (2006.01)
  *F16L 15/00*  (2006.01)
  *F16L 37/084*  (2006.01)

(52) U.S. Cl.
  CPC ......... *F16L 37/0885* (2019.08); *F16L 15/008* (2013.01); *F16L 37/0841* (2013.01); *F16L 37/088* (2013.01)

(58) Field of Classification Search
  CPC ... F16L 15/008; F16L 37/084; F16L 37/0841; F16L 37/086; F16L 37/088; F16L 37/0885; F16L 2201/10
  See application file for complete search history.

(56) References Cited

U.S. PATENT DOCUMENTS

| | | | |
|---|---|---|---|
| 4,313,828 A | | 2/1982 | Brownlee |
| 4,884,829 A | * | 12/1989 | Funk ................ F16L 37/0885 |
| 5,362,109 A | | 11/1994 | Pacht |
| 5,749,606 A | * | 5/1998 | Lu ..................... F16L 37/0885 |
| 6,386,596 B1 | * | 5/2002 | Olson |
| 11,988,305 B2 | * | 5/2024 | Nowicki ............... F16L 37/088 |
| 12,025,255 B2 | | 7/2024 | Surve |
| 12,117,111 B2 | * | 10/2024 | Dias |
| 2009/0166571 A1 | | 7/2009 | Asai et al. |
| 2015/0167878 A1 | * | 6/2015 | Liu ..................... F16L 37/0841 |
| 2015/0345684 A1 | * | 12/2015 | Kujawski, Jr. ...... F16L 37/0885 |
| 2016/0238173 A1 | * | 8/2016 | Kujawski, Jr. ...... F16L 37/0885 |
| 2018/0119858 A1 | * | 5/2018 | Rojas Lopez ....... F16L 37/0885 |
| 2019/0056034 A1 | | 2/2019 | Stearns |
| 2019/0128460 A1 | * | 5/2019 | Fremont ............. F16L 37/0885 |
| 2020/0248854 A1 | | 8/2020 | Stearns |
| 2021/0140570 A1 | | 5/2021 | Stroud |

FOREIGN PATENT DOCUMENTS

EP  3789647 A1 * 3/2021  .......... F16L 37/0885

* cited by examiner

*Primary Examiner* — William S. Choi

(74) *Attorney, Agent, or Firm* — Michael W. O'Neill, Esq.

(57) ABSTRACT

A fluid coupler for reducing fluid pressure failures by simplifying the coupling of two or more fluid carrying receptacles, lines, lines to and from a manifold, lines to and from a pressure tank, or the like. The fluid coupler has a coupling body and a fitting that features a positive engagement feature that activates when the fitting is fully inserted into the coupling body. This feature ensures a technician can easily verify the fitting is fully inserted into the coupling body, therefore reducing failures due to improper or incomplete engagement of the fitting.

12 Claims, 24 Drawing Sheets

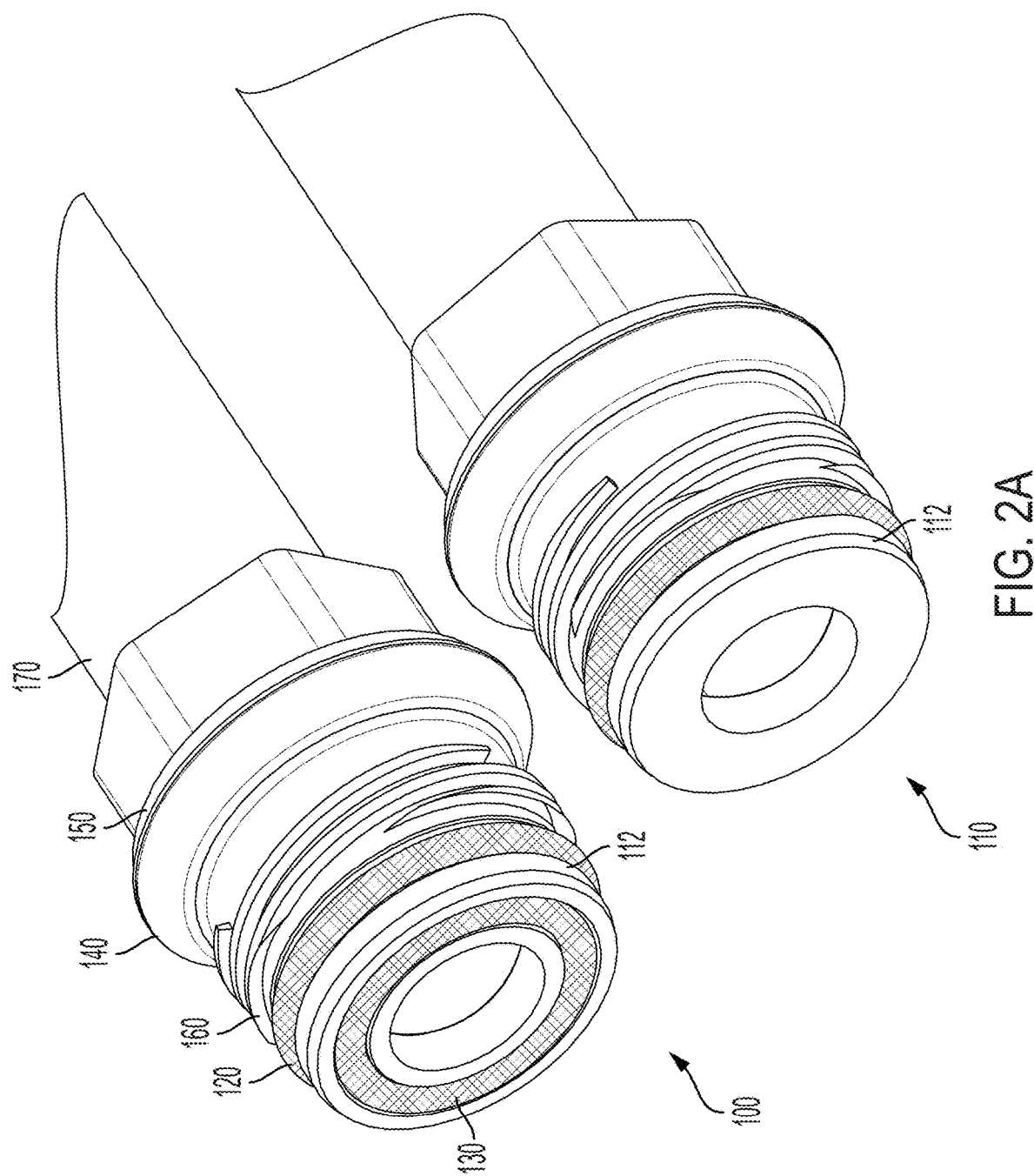

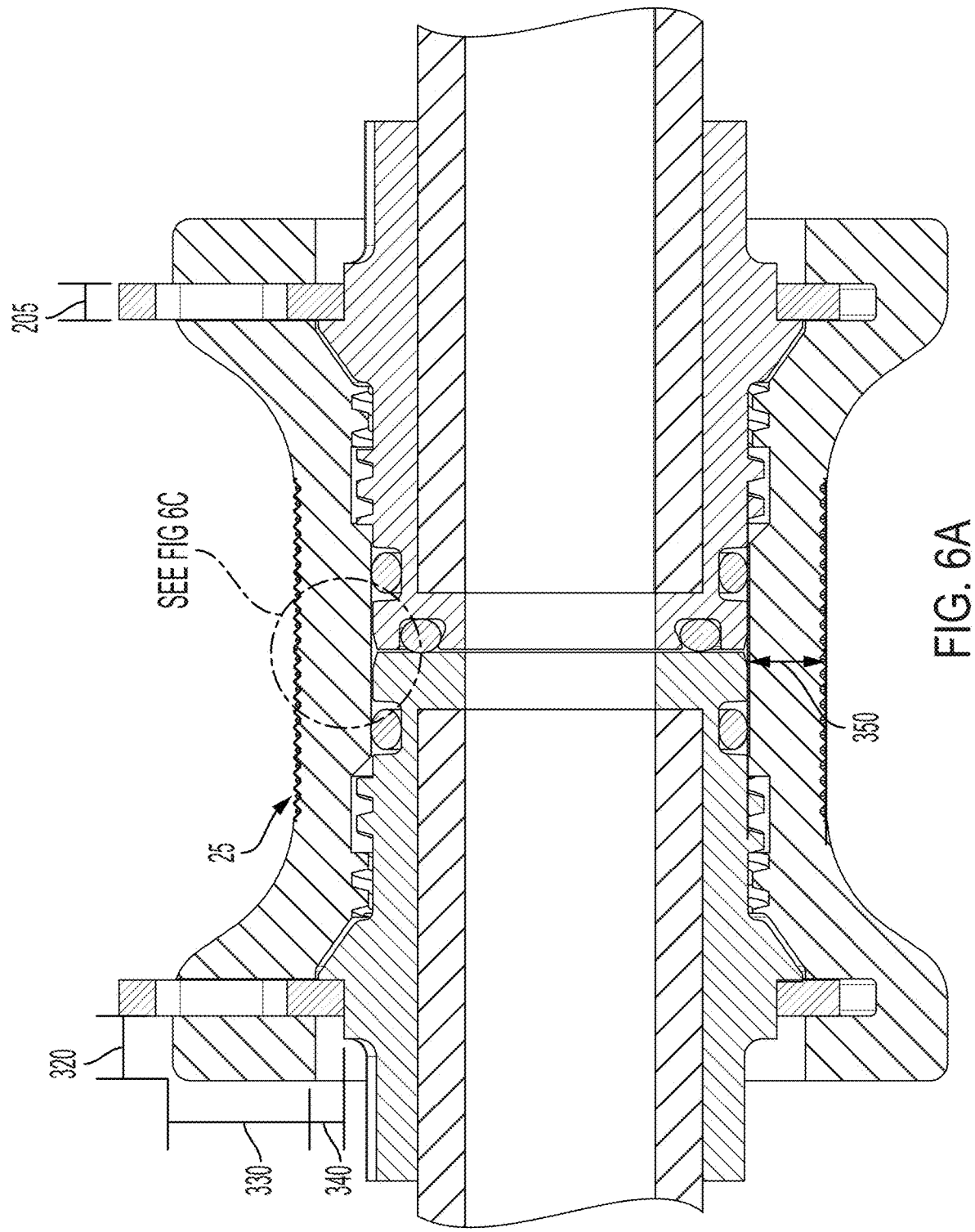

FLUID COUPLER WITH POSITIVE ENGAGEMENT INDICATOR

STATEMENT REGARDING FEDERALLY SPONSORED RESEARCH OR DEVELOPMENT

This invention was made with government support under contract N68335-24-C-0113 awarded by United States Department of the Navy—Naval Air Systems Command (NAVAIR). The government has certain rights in the invention.

BACKGROUND

In certain applications, it can be difficult to verify that a fitting is fully engaged into a coupling body. For example, in an installation environment where the technician does not have a clear line of sight to the fitting ('blind installation'), it could be difficult to ensure that the fitting is inserted correctly and fully. While specifying a torque rating that needs to be applied to the fitting is an existing approach to ensure the fitting is fully seated in these types of environments, a fitting that is cross threaded can reach that specified torque without fully seating into the coupling body. This results in fluid pressure loss and failure of the system.

Existing couplers (e.g., Eaton Aeroquip Ultra-Mate Fittings) of quick-disconnect type have coupling bodies and fittings that are assemblies of multiple individual pieces. These assemblies increase manufacturing, and therefore, end-use cost, and can lead to more failures due to the multiple connection points inherent to multi-body assemblies. Additionally, these couplers are typically large in size and weight where their use case is generally for applications that are size and weight sensitive.

For the foregoing reasons, there is a need for a fluid coupler having a simple coupling body and associated fitting adapter that allows simplifies installation and has a positive engagement indication to verify the fitting is fully and correctly seated into the coupling body.

SUMMARY

The present disclosure is directed at reducing fluid pressure failures by simplifying the coupling of two or more fluid carrying receptacles, lines, lines to and from a manifold, lines to and from a pressure tank, or the like. Particularly, the present disclosure describes a fluid coupler having coupling body and fitting that features a positive engagement feature that activates when the fitting is fully inserted into the coupling body. This feature ensures a technician can easily verify the fitting is fully inserted into the coupling body, therefore reducing failures due to improper or incomplete engagement of the fitting.

Additionally, the present disclosure further addresses blind installations by enabling full engagement of the fitting into the coupling body in under 1.5 revolutions. Existing solutions that utilize threading to engage the fitting require multiple revolutions to fully seat the fitting, which can be difficult in cramped or blind environments.

It is an object of the disclosure to provide a fluid coupler implementation for containing at least one retaining ring having an outer ring diameter, an inner ring diameter, and a pair of lugs to provide an indicator as to positive engagement, and having a coupling body having an external surface with opposing ends and having at least one slot having a length to allow the retaining ring to pass through the at least one slot and the slot is located at least one opposing end and an internal surface opposing the external surface and having at least one groove congruent with the at least one slot and for receiving the outer diameter of the retaining ring and a threaded section; and a fitting having a shank having a diameter less than the internal diameter of the retaining ring, a ramp shaped as a conical frustum having a first ramp diameter less than the internal diameter of the retaining ring and a second ramp diameter greater than the internal diameter of the retaining ring, and cylindrical retaining seat having a diameter less than the second ramp diameter.

It is a further object of the disclosure to implement the coupling body ends with opposing flanges positioned on the opposing ends.

It is a further object of the disclosure to further implement the coupling body has at least one flat surface or a knurling along the external surface.

It is a further object of the disclosure to implement the internal surface further comprises at least one first conical frustum adjacent the at least one groove congruent with the at least one slot and the first conical frustum tapering toward at least one threaded section having a major diameter and adjacent the at least one threaded section is a relief groove having a diameter larger than the major diameter of the threaded section and at least one second conical frustum tapering toward a sealing section.

It is a further object of the disclosure to implement at least one second conical frustum adjacent the relief groove and tapering toward a sealing section.

It is a further object of the disclosure to further implement the sealing section is cylindrical in shape.

It is a further object of the disclosure to further implement the fitting further comprising a face seal surface at a first end of the fitting.

It is a further object of the disclosure to implement that between the face seal and the shank is threading.

It is a further object of the disclosure to implement that the face seal surface contains a groove for a seal.

It is a further object of the disclosure to further implement that the threading permits the fitting to be threaded into the coupling body.

It is a further object of the disclosure to further implement that the face seal and the threading is a cylindrical surface.

It is a further object of the disclosure to further implement that the cylindrical surface contains a groove of a seal.

It is a further object of the disclosure to provide an implementation of a coupling body having an external surface with opposing ends having at least one slot having a length to allow the retaining ring to pass through the at least one slot and the slot is located at least one opposing end and an internal surface opposing the external surface and having at least one groove congruent with the at least one slot and for receiving the outer diameter of the retaining ring and a threaded section.

It is a further object of the disclosure to further implement that the coupling body ends with opposing flanges positioned on the opposing ends.

It is a further object of the disclosure to further implement that the coupling body has at least one flat surface or a knurling along the external surface.

It is a further object of the disclosure to further implement the internal surface further comprises at least one first conical frustum adjacent the at least one groove congruent with the at least one slot and the first conical frustum tapering toward at least one threaded section having a major diameter and adjacent the at least one threaded section is a relief groove having a diameter larger than the major diameter of the threaded section and at least one second conical frustum tapering toward a sealing section.

It is a further object of the disclosure to implement that at least one second conical frustum adjacent the relief groove and tapering toward a sealing section.

It is a further object of the disclosure to further implement that the sealing section is cylindrical in shape.

It is a further object of the disclosure to provide an implementation of a fitting having a shank having a diameter less than the internal diameter of a retaining ring, a ramp shaped as a conical frustum having a first ramp diameter less than the internal diameter of the retaining ring and a second ramp diameter greater than the internal diameter of the retaining ring, and cylindrical retaining seat having a diameter less than the second ramp diameter.

It is a further object of the disclosure to implement that the fitting further comprising a face seal surface at a first end of the fitting member.

It is a further object of the disclosure to further implement that between the face seal and the shank is threading.

It is a further object of the disclosure to implement that the face seal surface contains a groove for a seal.

It is a further object of the disclosure to implement that the threading permits the fitting to be threaded into the coupling member.

It is a further object of the disclosure to further implement that between the face seal and the threading is a cylindrical surface.

It is a further object of the disclosure to further implement that the cylindrical surface contains a groove for a seal.

It is a further object of the disclosure to further implement that the face seal surface is a protruding face seal surface.

It is a further object of the disclosure to further implement that the protruding face seal surface contains a groove for a seal.

It is a further object of the disclosure to further implement that the face seal surface is a concavity face seal surface.

It is a further object of the disclosure to further implement that the concavity face seal surface contains a groove for a seal.

It is a further object of the disclosure to implement a process of assembling a fluid coupler having a positive engagement indication, by providing a retaining ring having an outer diameter, inner diameter, and a pair of lugs; providing a coupling body having an external surface with opposing ends and having at least one slot having a length to allow the retaining ring to pass through the at least one slot and the slot is located at least one opposing end and an internal surface opposing the external surface and having at least one groove congruent with the at least one slot and for receiving the outer diameter of the retaining ring and a threaded section, and a relieve groove opposite the slot; providing a fitting having a shank having a diameter less than the internal diameter of the retaining ring, a ramp shaped as a conical frustum having a first ramp diameter less than the internal diameter of the retaining ring and a second ramp diameter greater than the internal diameter of the retaining ring, and cylindrical retaining seat having a diameter less than the second ramp diameter, a face seal surface at a first end of the fitting, and between the face seal and the shank is threading; inserting the retaining ring through the slot and into the congruent groove; inserting the fitting body into the coupling body by threading the fitting and coupling body together with the threaded section on the coupling body and the threading on the fitting; rotating at least one of the fitting and the coupling body such that the lugs expand as the inner diameter of the retaining ring traverses the ramp; continuing to rotate at least one of the fitting and the coupling body until the thread section is in the relieve groove and the distance between the pair of lugs is less than the distance of the lugs when the inner diameter of the retaining ring was traversing the ramp; and whereby upon the threading of the fitting being in the relieve groove the coupling body is free to spin around the fitting and the fitting is free to spin around the coupling body.

An advantage of the present disclosure is that the unique features disclosed herein enable: (i) installation in constrained environments with the positive engagement indication provided by a retaining ring's lugs; (ii) high pressure carrying capabilities (>5,000 psig) in high vibration and temperature environments by applying to axial force from the pressure against a retaining ring to lock the fitting adapters in place instead of traditional means such as threading; and (iii) the simple design consisting of only a single coupling body and a single fitting for each tube to minimize failures and cost seen with traditional multi-assembly fittings.

BRIEF DESCRIPTION OF THE DRAWINGS

These and other features, aspects, and advantages of the disclosure will become better understood given the following description, appended claims, and accompanying drawings where:

FIG. 2A shows an isometric view of two embodiments of the fitting attached to a tube: one with a face seal and one without a face seal.

FIG. 6A shows a half section view of a 5,000 psig working pressure, weight and size minimized embodiment with knurling for hand tightening.

DESCRIPTION

In the Summary above and the Description, and the claims below, and in the accompany drawings, reference is made to particular features (including method steps) of the implementations with the disclosure. It is to be understood that the disclosure of the implementations in this description include all possible combinations of such particular features. For example, where a particular aspect or embodiment of the implementation, or a particular claim, that feature can also be used, to the extent possible, in combination with and/or in the context of the other particular aspects and implementations of the disclosure, and in the disclosure generally.

As used herein, a fluid "line" refers to receptacles, lines, tubes, fittings, lines to and from a manifold, lines to and from a pressure tank, lines to and from a pump, lines to and from a heat exchanger, lines to and from an accumulator, lines to and from a liquid receiver, lines to and from any form of reservoir, lines to and from any fluid containing space that can convey or contain a working fluid.

As used herein, a "fitting" refers to a male threaded part that is rigidly attached to one of the fluid lines to be connected.

As used herein, a "coupling body" refers to a female threaded part that holds one or more fitting adapters together or against another sealing surface to form a pressure sealed union between two or more fluid lines or to form a pressured sealed termination of a single fluid line.

As used herein, the term "very high pressure" (VHP) refers to fluid lines with a designed working pressure above 5,000 psi with a designed minimum proof pressure 150% of working pressure and designed minimum burst pressure of 250% of working pressure. VHP variants of the present disclosure are primarily aimed at systems such as high-pressure water cutting and cleaning, hydraulic, testing, and industrial cleaning.

As used herein, the term "high pressure" (HP) refers to fluid lines with a designed working pressure of 5,000 psi with a designed minimum proof pressure of 7,500 psi (150% of working pressure) and designed minimum burst pressure of 12,500 psi (250% of working pressure). HP variants of the present disclosure are primarily aimed at systems such as hydraulic and pneumatic.

As used herein, the term "medium pressure" (MP) refers to fluid lines with a designed working pressure of 1,500 psi with a designed minimum proof pressure of 2,250 psi (150% of working pressure) and designed minimum burst pressure of 3,750 psi (250% of working pressure). MP variants of the present disclosure are primarily aimed at systems such as fuel, high-pressure water cutting and cleaning, pneumatic, and braking.

As used herein, the term "low pressure" (LP) refers to fluid lines with a designed working pressure of less than 1,500 psi. LP variants of the present disclosure are primarily aimed at systems such as oil, cooling, pneumatic, and water pumping.

Figure 1A:
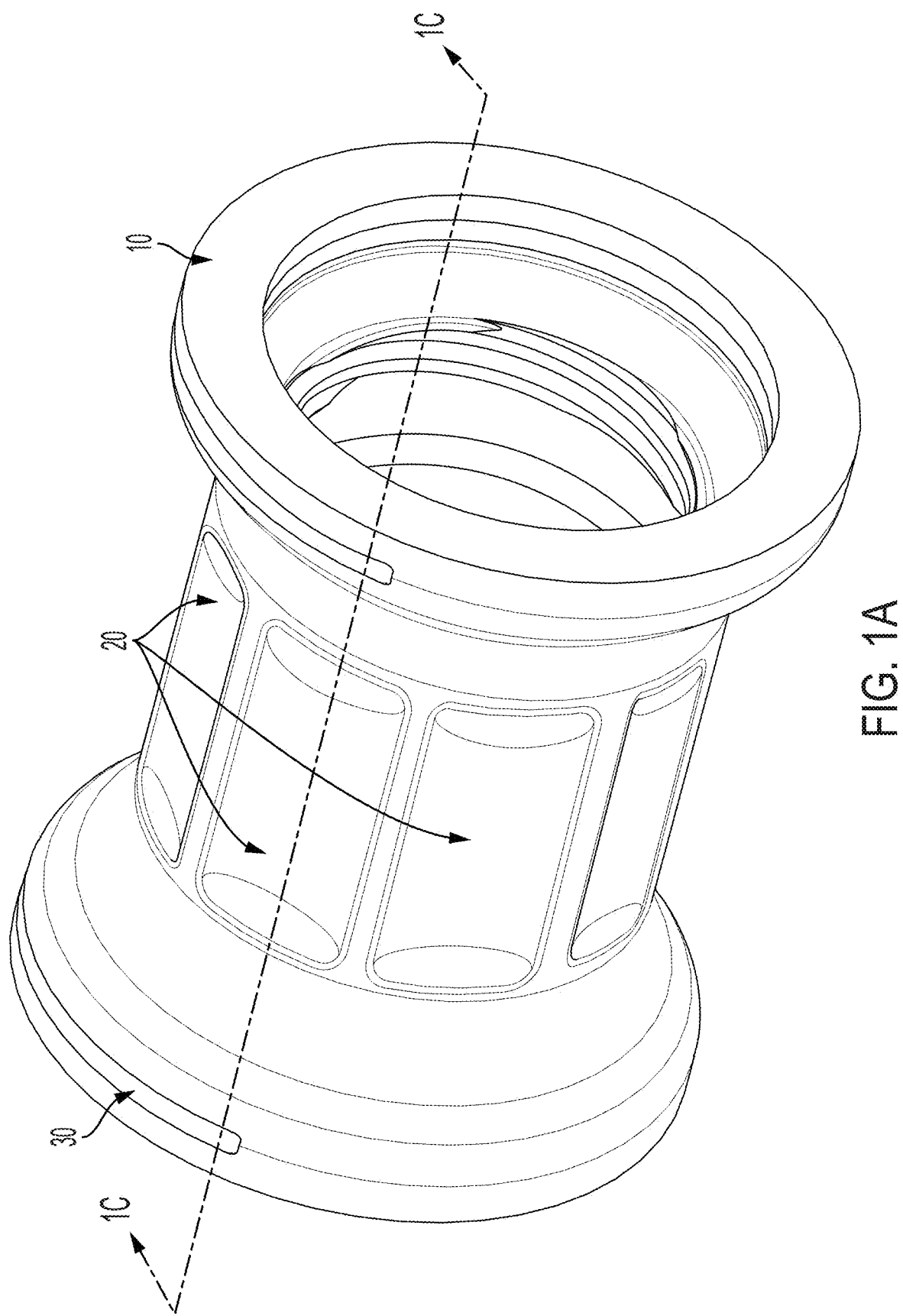
FIG. 1A shows an isometric view of the coupling body.
Figure 1B:
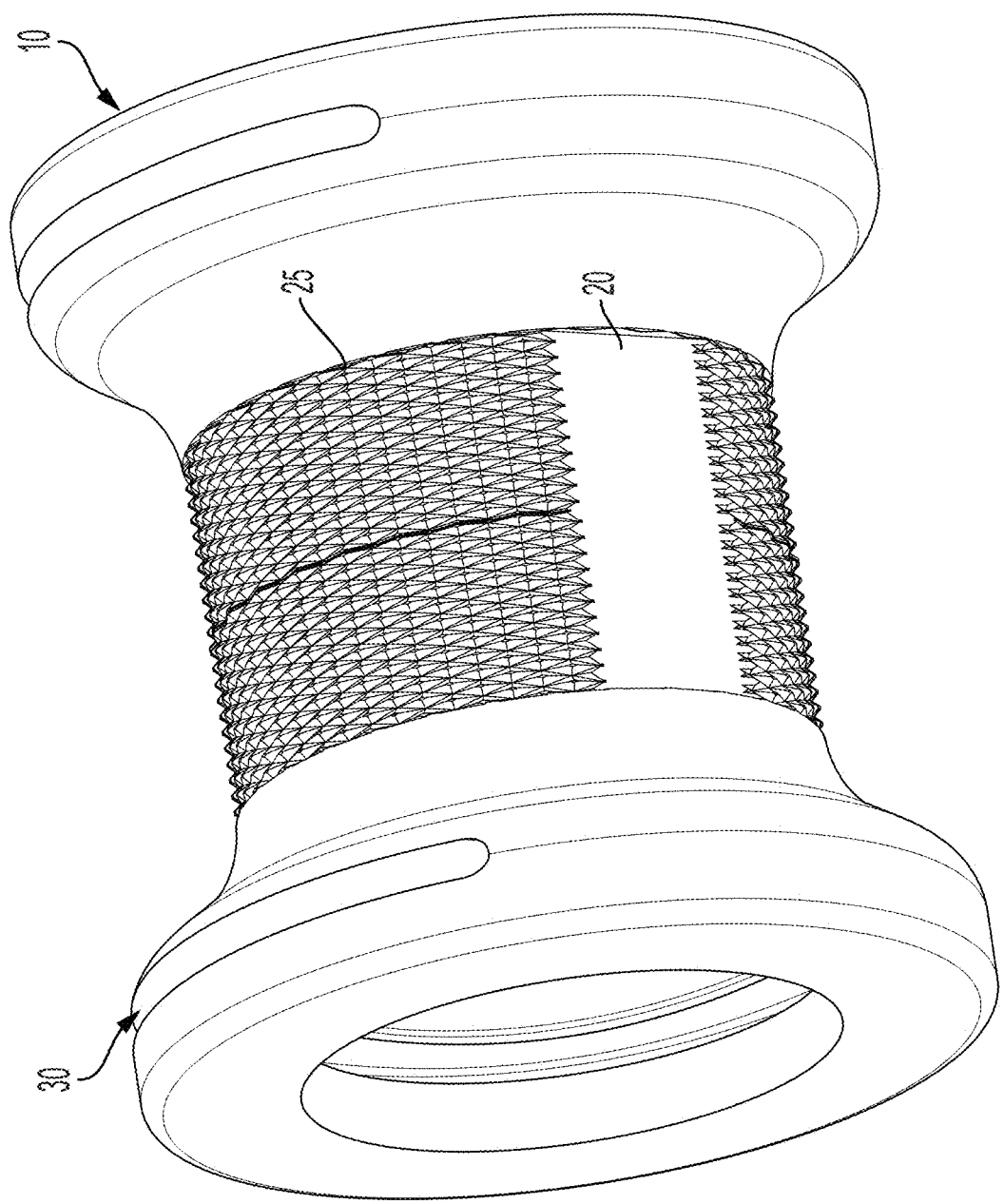
FIG. 1B shows an isometric view of another coupling body.
Figure 5A:
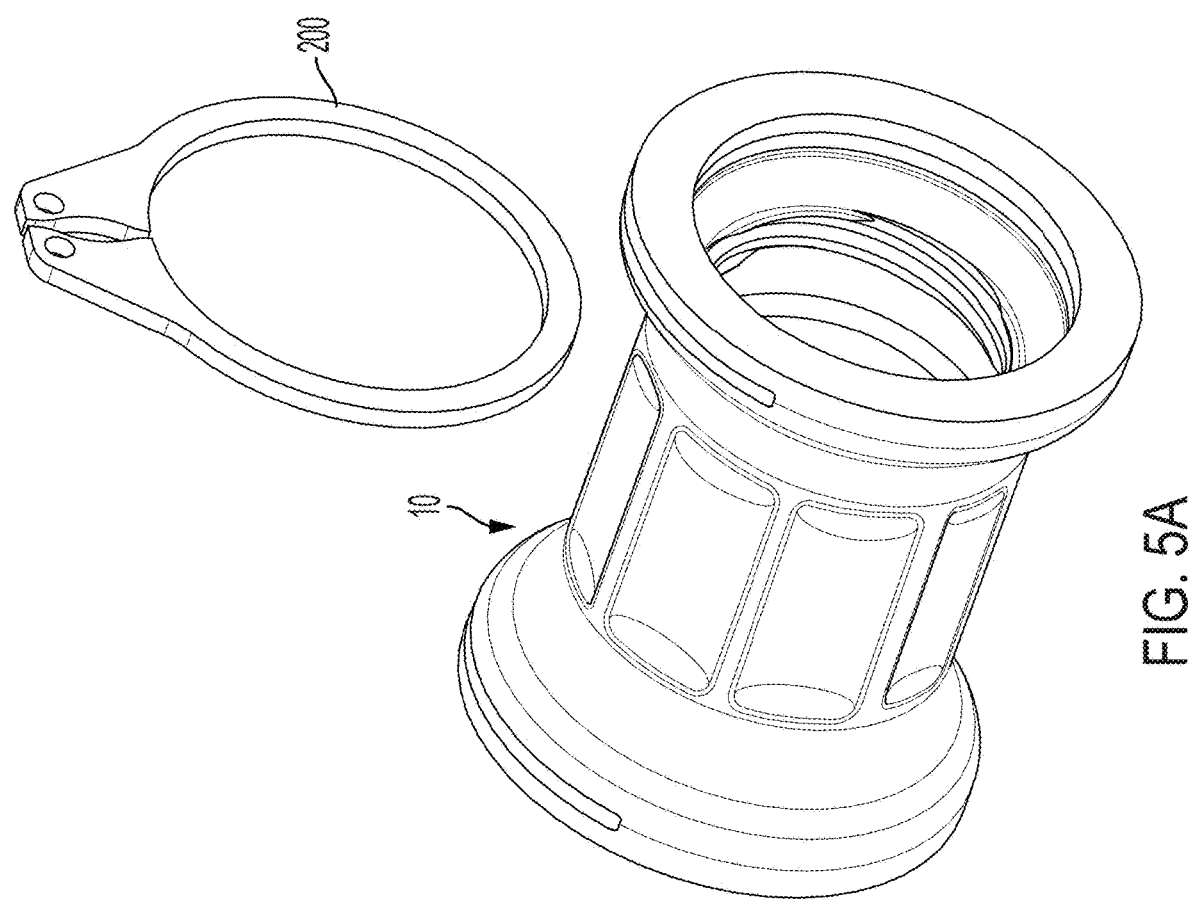
FIG. 5A shows an isometric view of the retaining ring and coupling body subassembly not assembled.
Figure 5B:
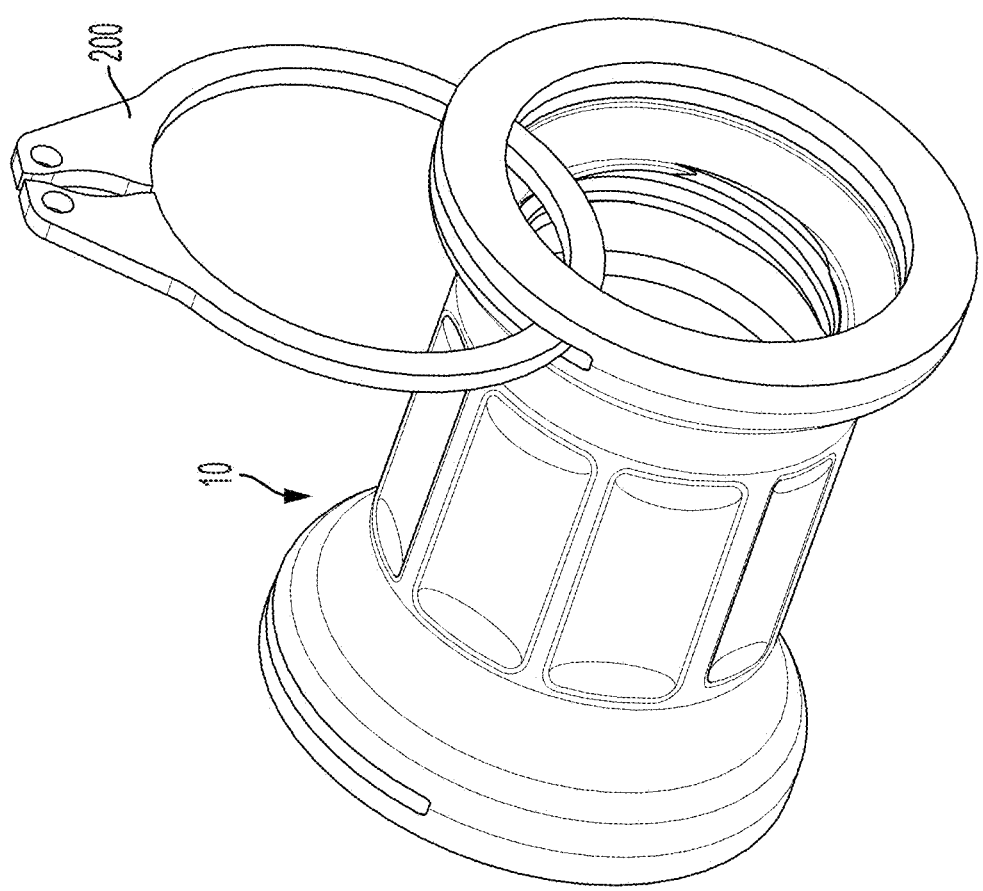
FIG. 5B shows an isometric view of the retaining ring and coupling body subassembly partially assembled.
Figure 5C:
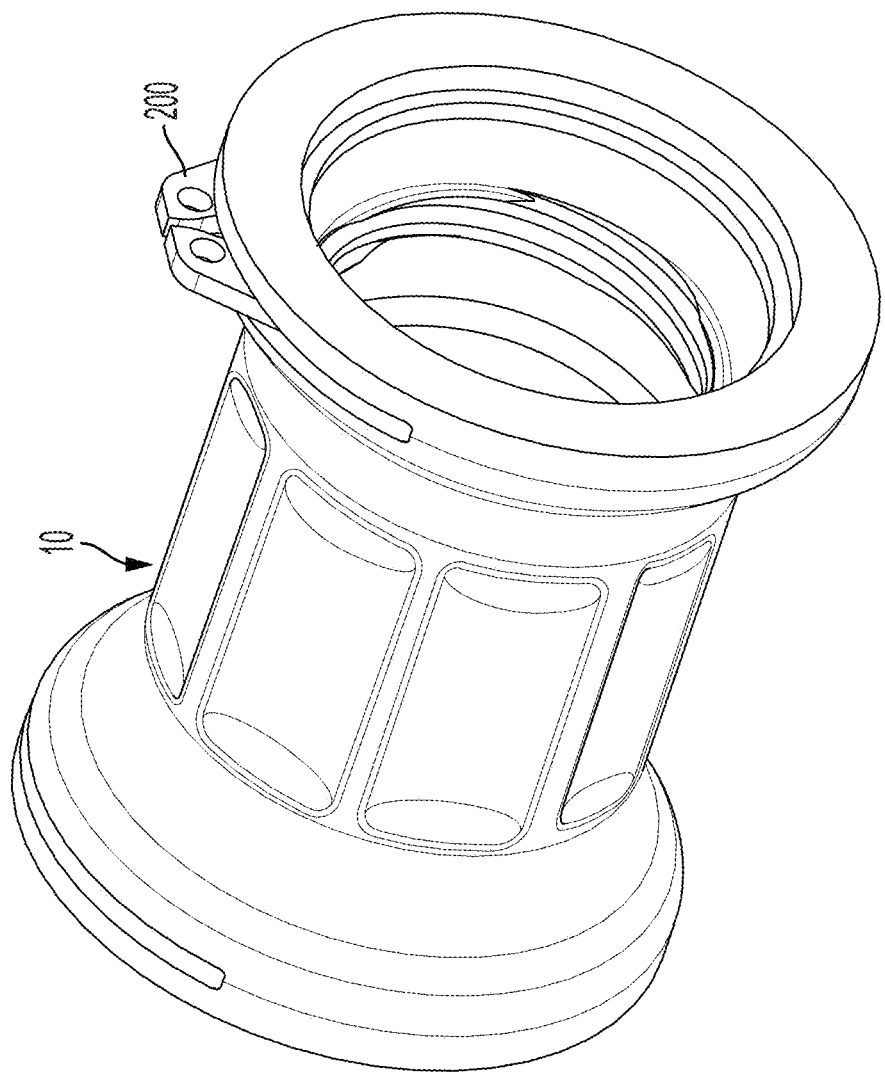
FIG. 5C shows an isometric view of the retaining ring and coupling body subassembly fully assembled.
Figure 7A:
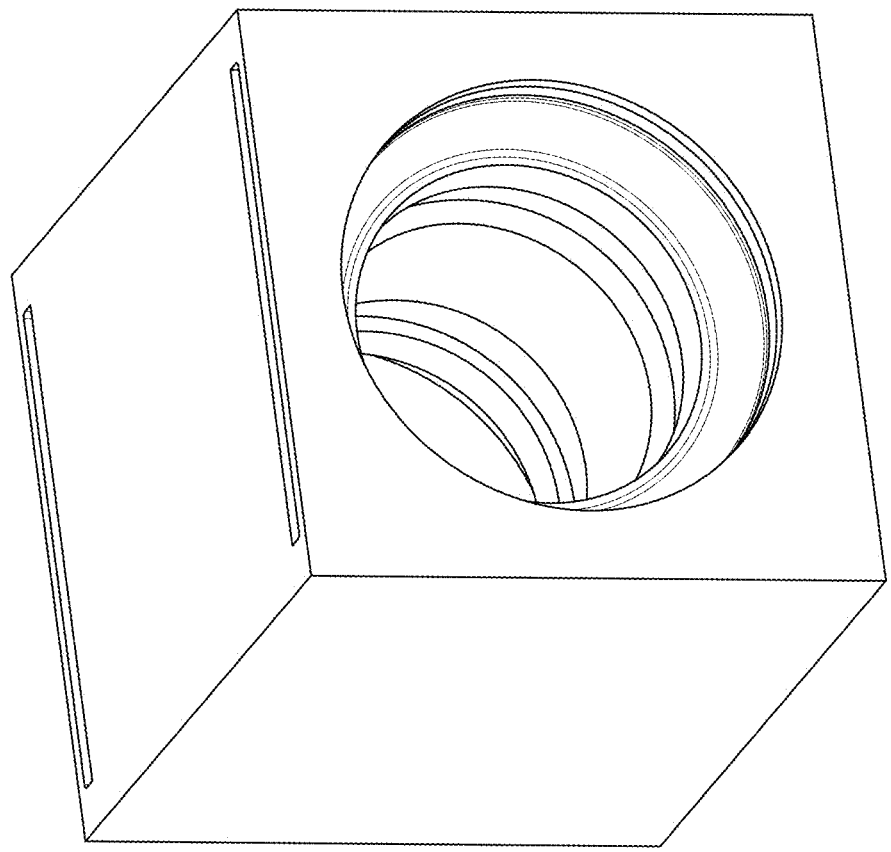
FIG. 7A shows an isometric view of another coupling body.
Figure 7B:
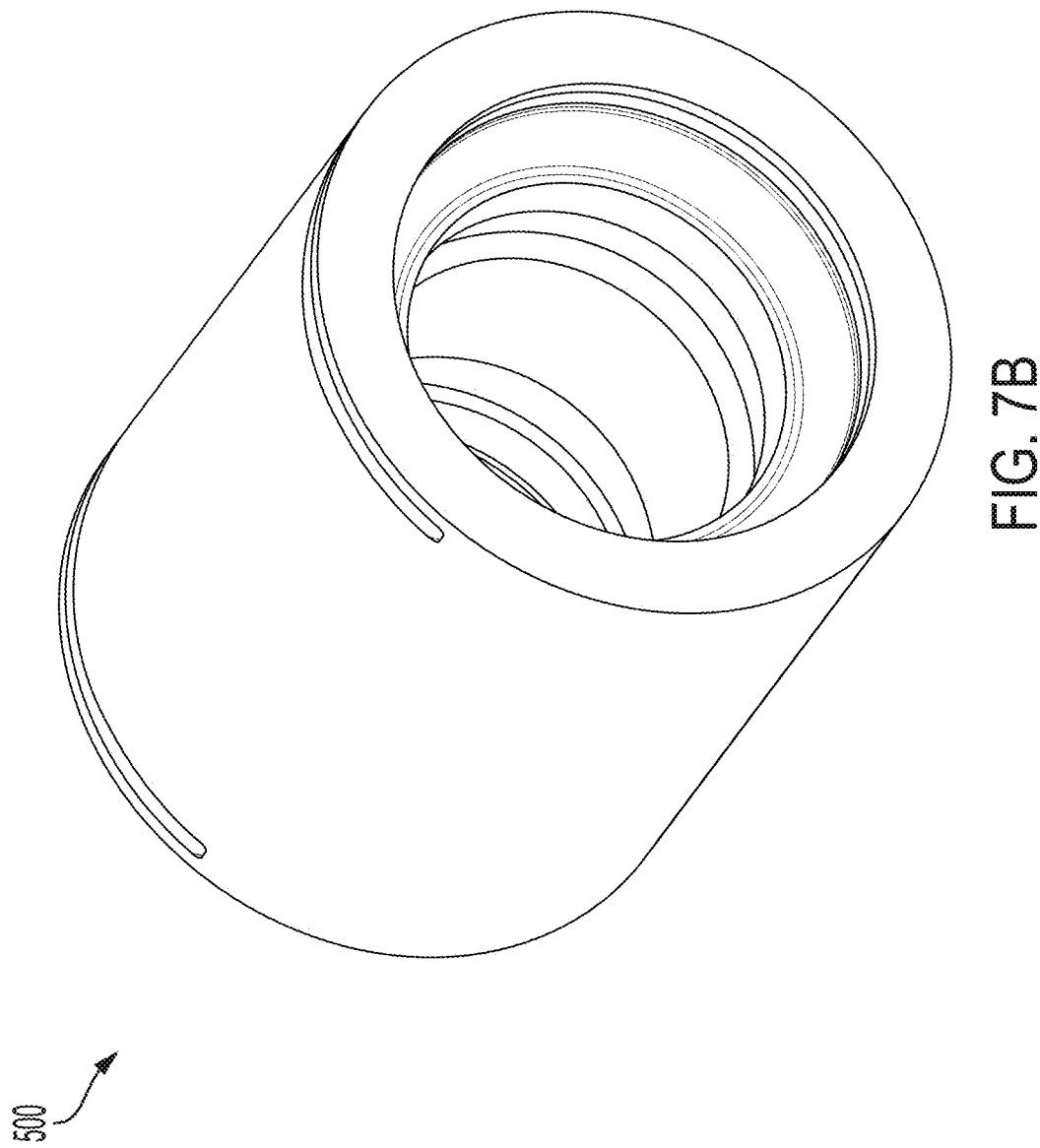
FIG. 7B shows an isometric view of yet another coupling body.
Figure 7C:
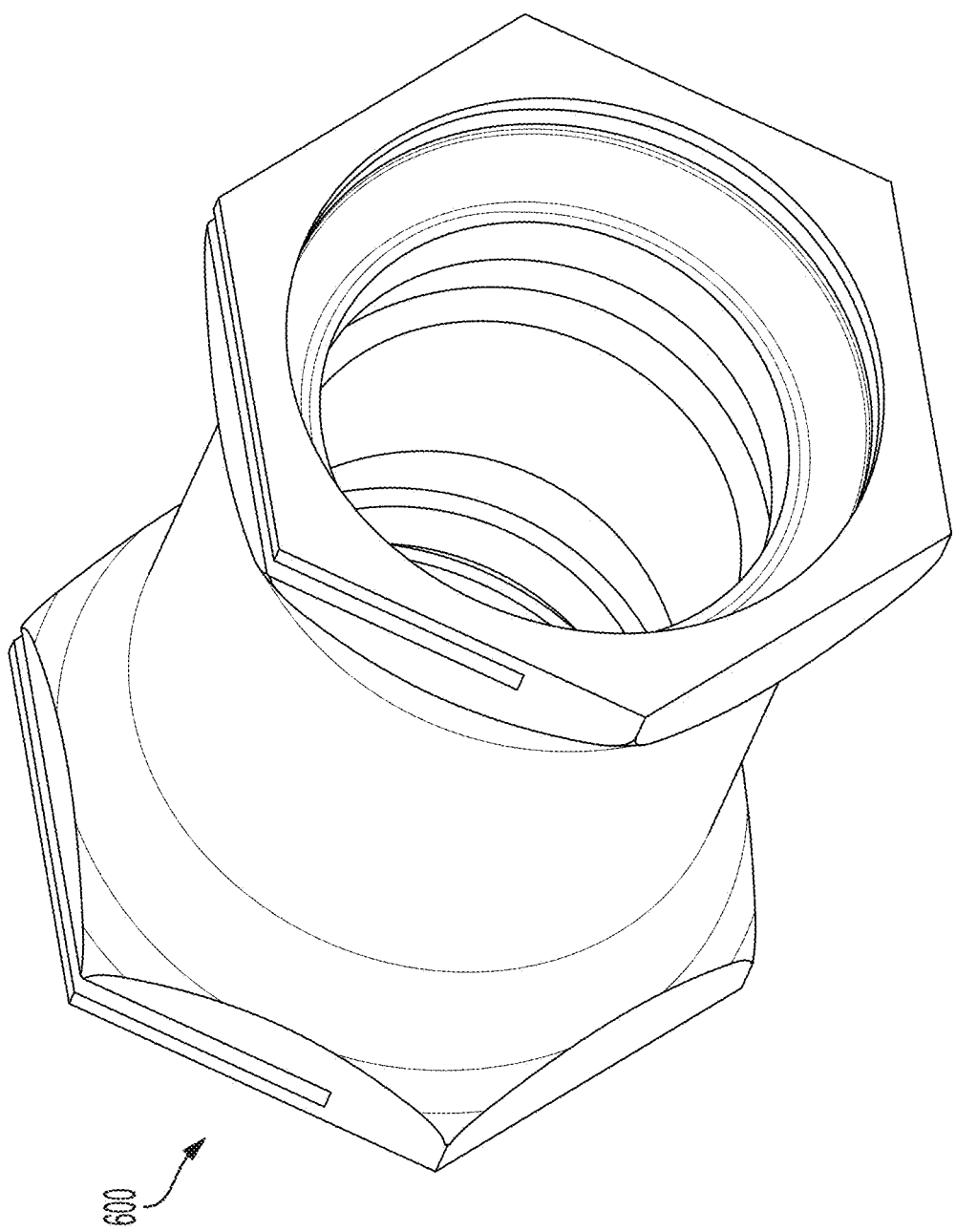
FIG. 7C shows an isometric view of yet another coupling body.
Figure 7D:
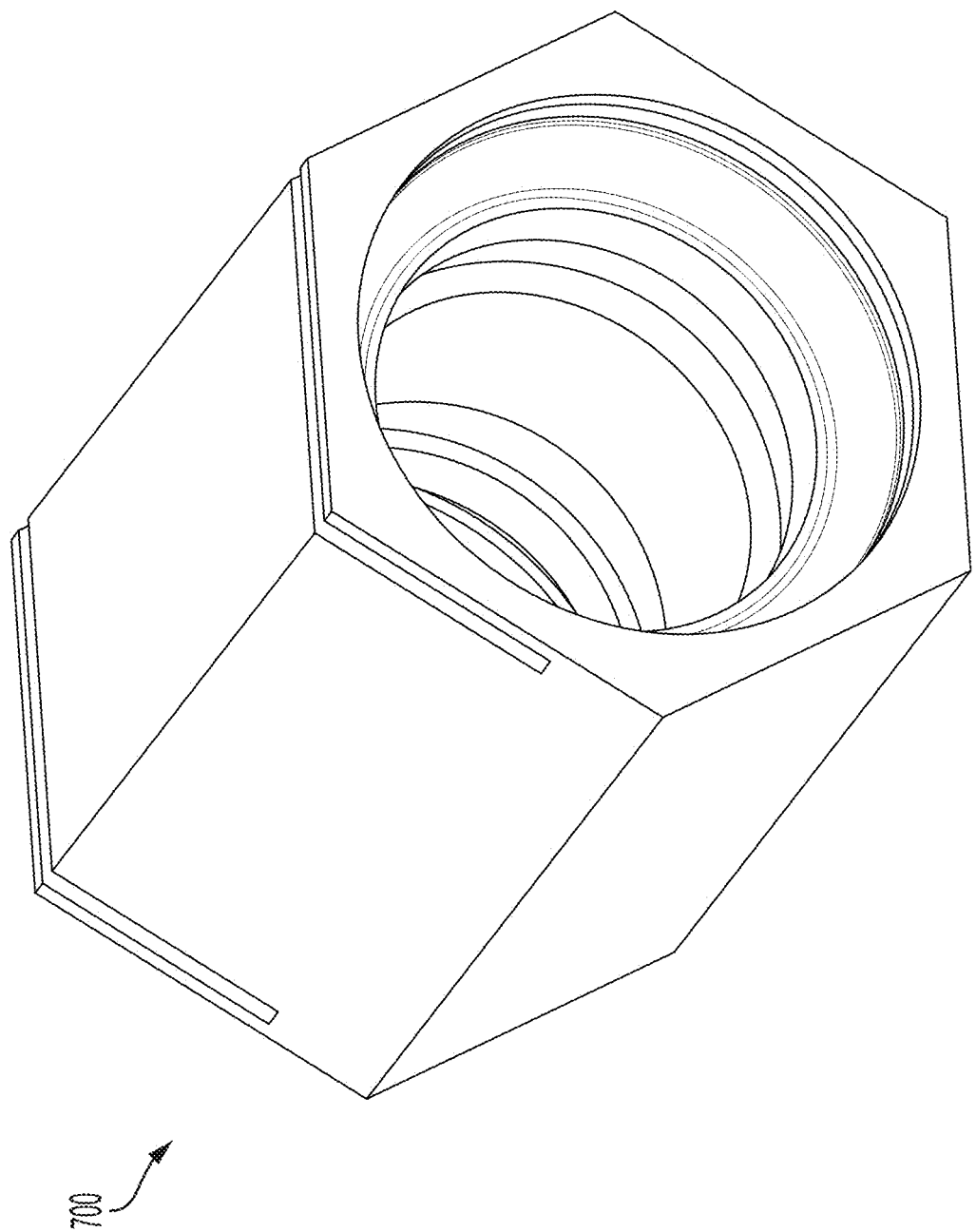
FIG. 7D shows an isometric view of yet another coupling body.

FIG. 1A depicts the coupling body 10. The coupling body 10 has a general spool shape with a tapered or chamfered transition between the outer, larger diameter flange, and the inner, smaller diameter barrel. In one possible implementation, the coupling body has length-wise flat sections 20 for gripping with a wrench, plier, or other gripping tool. It is also contemplated that the flat sections 20 may be replaced, supplemented, or alternated with knurling or other texturing for hand-assembly (knurling depicted as 25 in FIG. 1B), or may be forgone to decrease manufacturing cost or increase the coupling body's internal pressure resistance. The flange on each side of the coupling body features an insertion slot 30 to allow insertion of a retaining ring, and an axially-revolved side slot 40 ('groove') that allows the retaining ring 200 to sit with its center axis to be aligned with the lengthwise center axis of the coupling body. The insertion slot 30 and groove 40 share a length-wise width with a positional and dimensional tolerance of no greater than 0.002" to achieve a no greater than 0.005" gap between the faces of the fitting adapters to eliminate the need for a back-up ring for the face seal even at high pressures. The insertion slot 30 is cut at a depth that fully breaks through the coupling body's flange to allow full insertion of the retaining ring 200 into the groove 40. During assembly, a retaining ring 200 is inserted into the retaining ring slot 30, as shown in FIG. 5A, FIG. 5B, and FIG. 5C. The coupling body is not limited to the external surface being general spool shape as shown in FIG. 1A. For example, the coupling body shape can a hexahedron shaped 400 (FIG. 7A), a cylindrical shaped 500 (FIG. 7B), a hexagon flanges with a cylindrical shaped mid-section 600 (FIG. 7C), or a hexagonal prism shaped 700 (FIG. 7D).

The coupling body 10 is designed to minimize its diameter, length, and weight while retaining a high pressure carrying capability for size and weight constrained applications, such as in the aerospace industry. Different embodiments of the coupling body 10 can be made to address the needs of different industries; for example, the coupling body 10 may be made larger to have a higher pressure carrying capability, or the coupling body 10 may be made of a variety of materials, such as titanium, Inconel, stainless steel, or polymers to improve compatibility with different fluids, further reduction of weight, or improvement of pressure carrying capability.

Figure 1C:
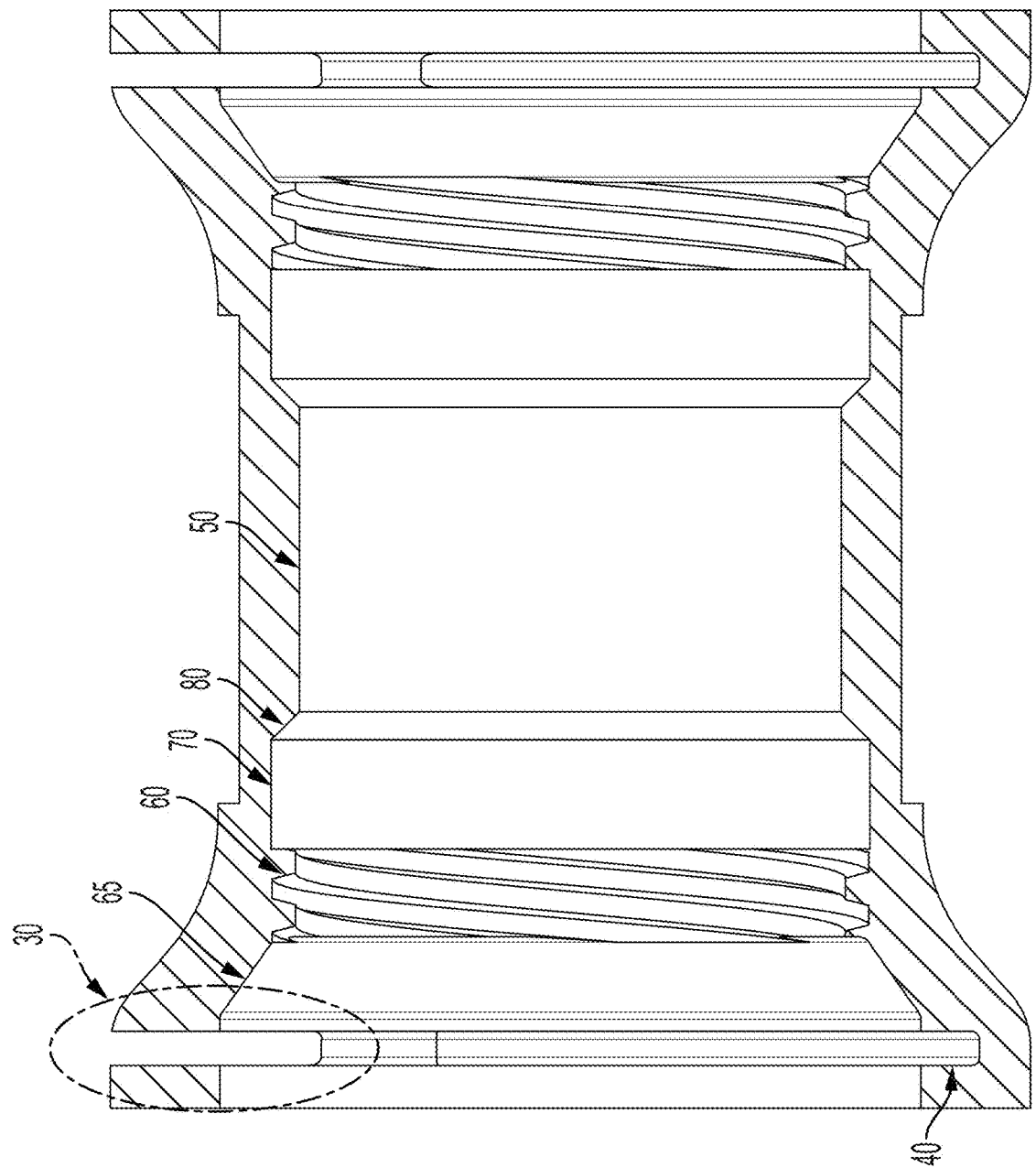
FIG. 1C shows a side half-section view of the coupling body.

FIG. 1C shows a half sectional view of the coupling body 10 along section line A-A in FIG. 1A. This view shows the internal features of the coupling body 10, including: the retaining ring groove 40 where the retaining ring 200 rests after being inserted through the insertion slot 30, internal threading 60 for seating the fitting 100 (FIG. 2A) into the coupling body 10, an annular recess to act as a relief groove 70, and an cylindrical sealing section 50 where the gland o-ring 120 is compressed for fluid sealing. The relief groove 70 has a characteristic larger outer diameter recess than the fitting 100 threading's 160 crest to allow the coupling body 10 to freely rotate about the fitting 100 when fully inserted. Between the retaining ring groove 40 and the internal threading 60 is conical frustum 65 that tapers toward the internal threads. In between the cylindrical sealing section 50 and relief groove 70 is conical frustum 80 that tapers toward sealing section 50 to guide the o-ring into the annular sealing section 50, when a gland o-ring 120 is present on the fitting 100.

In other embodiments, the coupling body 10 may be supplemented with a pressure relief valve (PRV) 90 that is seated thickness-wise through the annular sealing section 50. This PRV would trigger in the case of seal 130 (see FIG. 2A) failure to vent the internal pressure and prevent retaining ring failure which can cause the tubing assembly from being ejected from the coupling body. The depicted embodiment of an elastomeric PRV 90 being used is most likely in low-pressure, low-temperature applications, though in some embodiments, other types of PRVs could be implemented to meet specific application requirements.

Figure 2B:
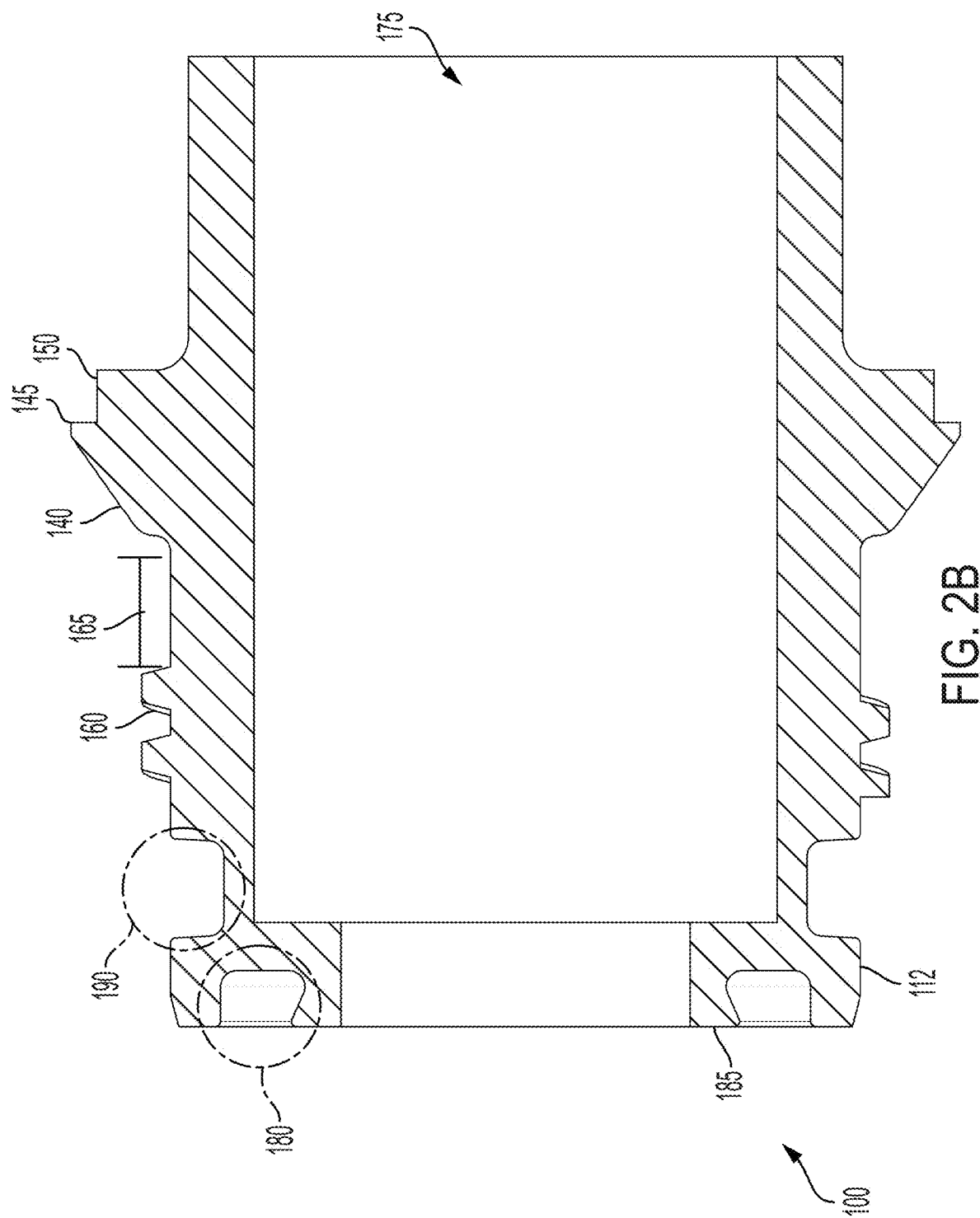
FIG. 2B shows a side half-section view of the fitting embodiment with a face seal.

FIG. 2A depicts two possible embodiments of the fittings for use in the coupling body 10. Fitting 100 may include an annular face seal groove 130, while other fitting 110 are without a face seal groove 130. Both of these embodiments are brazed, welded, or otherwise rigidly attached to a tube 170, but in other embodiments, such as alterative fitting 111 in FIG. 2D, they may be attached to manifolds 400 (such as shown in FIG. 2E) pressure vessels, or any other fluid-containing vessel, container, or receptacle through rigid or removable means such as threading 171 (shown in FIG. 2D). In yet other embodiments, the tubing 170 may be attached to the fittings 100, 110 through semi-permanent means, such as by flaring the tube end and having a two-piece tube adapter to seal around the flared end similar to Army-Navy (AN) fittings. Characteristic features of the fittings 100, 110 include external threading 160, a conical frustum ramped section 140 (best seen in FIG. 2B) to guide and expand the retaining ring 200 evenly onto the retaining seat 150, an optional gland o-ring 120 for backup fluid retention or vibration mitigation, and a face seal 130. Each set of fittings 100, 110 may have an annular face seal 130 or gland o-ring 120, or both. In instances where an annular face seal 130 is used, only one fitting 100 will have the face seal 130, while the other fitting 110 will have a flat sealing face to provide a smooth face for the face seal 130 to compress and seal against.

FIG. 2B shows a half section view of the fitting adapter with the face seal groove. At the sealing end 112 is the o-ring groove 180 on the surface face 185 to contain the face seal 130 may be a standard gland groove, a half-dovetail groove 180 (depicted), or a full-dovetail groove. The type of groove depends on the desired pressure rating of the coupler/fitting assembly and use case for the fitting. For example, a full-dovetail groove is captive to a face seal o-ring, thereby reducing the chance of the o-ring from dislodging during installation. However, a full-dovetail groove typically is costlier to manufacture than a standard gland groove, and it generally does not have as high of a pressure-scaling capability as a standard gland groove. A half-dovetail groove is typically the most difficult to manufacture, but is captive to an o-ring and has a higher pressure-scaling capability than a full-dovetail groove. Therefore, in applications such as aerospace vehicles that have high pressure fluids and components sensitive to foreign object damage (FOD), a half-dovetail groove, while slightly costlier, is advantageous. In comparison, an application such as automotive vehicles where costs are minimized and components are more easily accessible for installation, a standard groove or full-dovetail groove may be used.

The optional gland o-ring groove 190 is depicted for when a seal or gland o-ring 120 is used. Threading 160 having a major diameter and minor diameter and a is used to provide a mechanical advantage for seating the fitting to compress the annular face seal 130 and expand the retaining ring 200 for locking. The grip length or cylindrical shank 165 between the threads 160 and cylindrically-revolved ramped section 140 is recessed to allow the fitting 100, 110 to free spin in the coupling body 10; this grip length or shank 165 sits within the area of female threads 60 of the coupling body 10 when the fitting 100, 110 is fully seated. As the fitting 100, 110 is inserted into the coupling body 10, the retaining ring 200 passes across the grip length or shank 165 and the ring approaches the ramped section 140 that evenly expands the retaining ring 200, until it falls over the ramped section's shoulder 145 and fully seats onto the retaining seat 150. Once the retaining ring 200 is on the retaining seat 150, the fitting 100, 110 can only be removed by expanding the retaining ring 200 to a diameter greater than the ramp shoulder 145. Depicted is a fitting 100, 110 that is designed to have a tube 170 inserted into a recessed cavity 175 and brazed, welded, or otherwise rigidly attached to the fitting 100, 110.

Figure 2C:
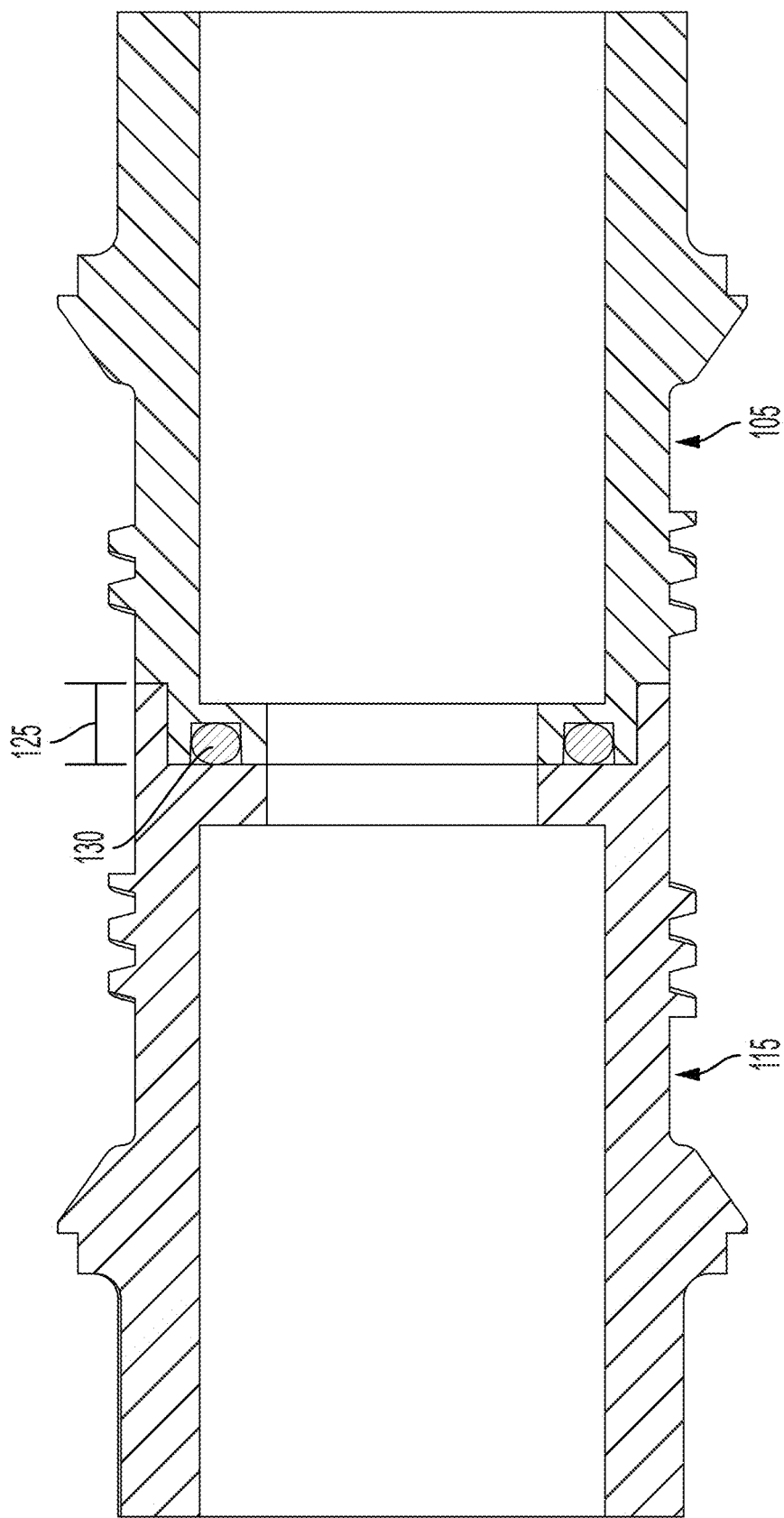
FIG. 2C shows a side half-section view of one embodiment of the fitting where the two fittings nest into each other.
Figure 2D:
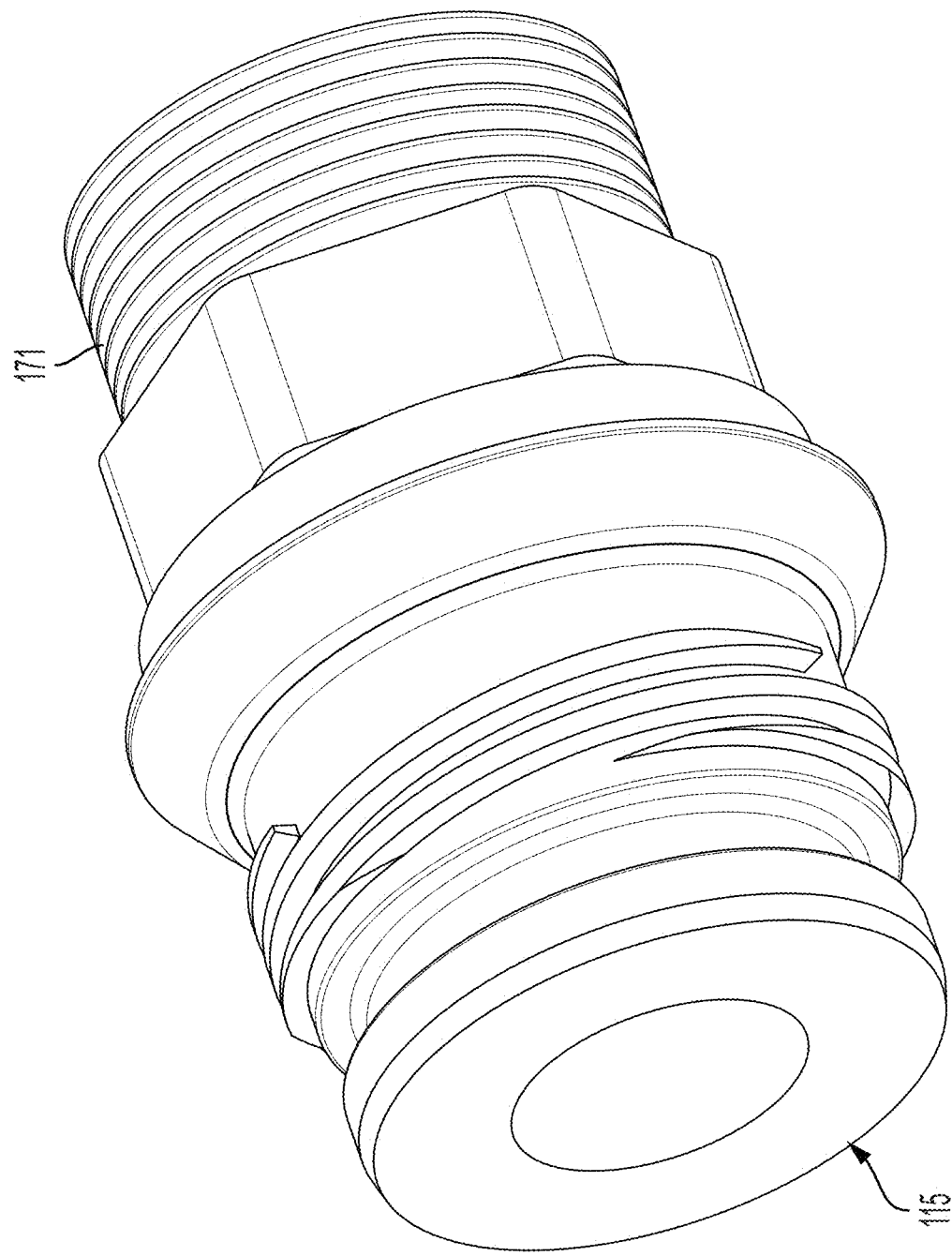
FIG. 2D shows another embodiment of the fitting where the fitting is threaded for non-permanent installation onto a fluid line.
Figure 2E:
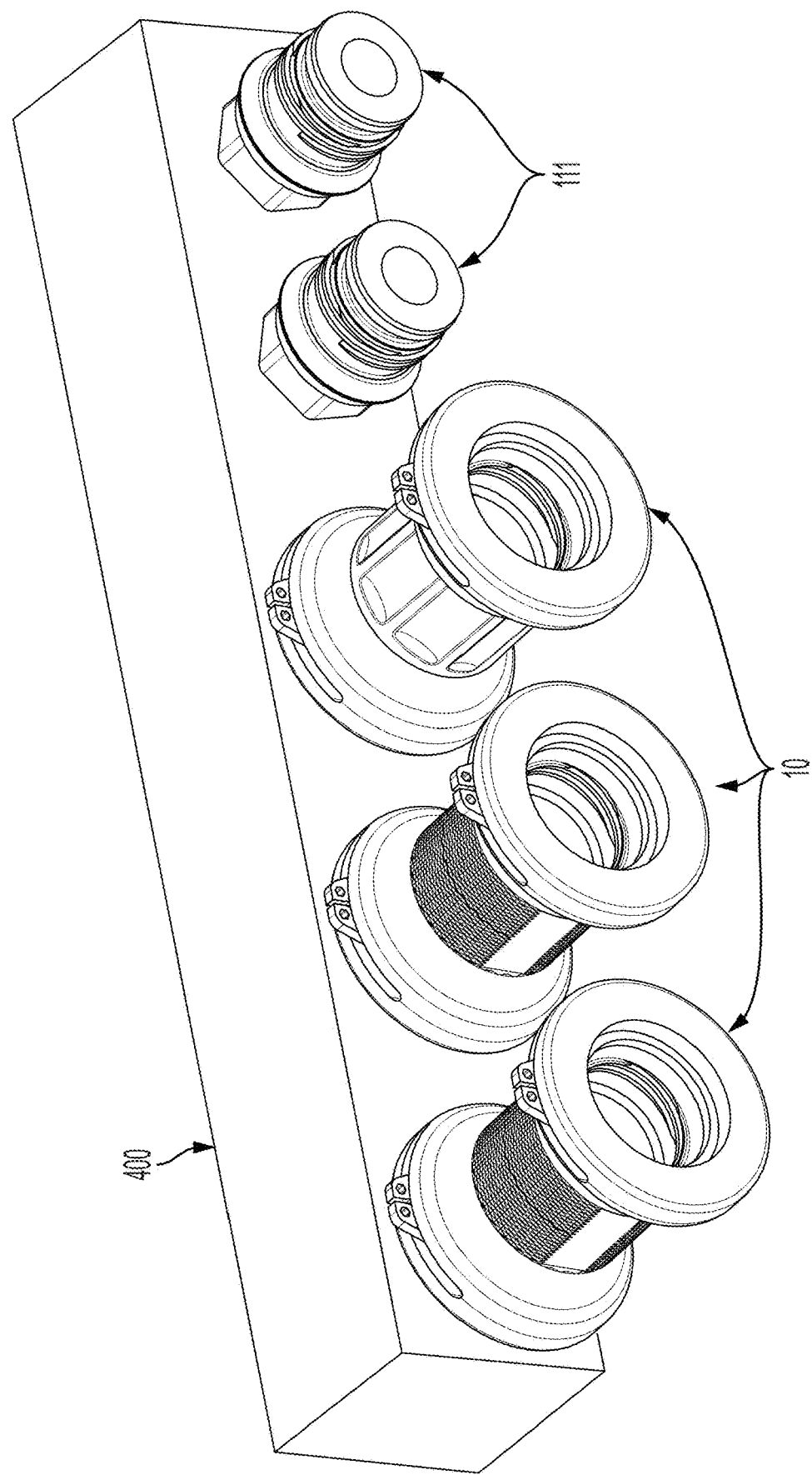
FIG. 2E shows an assembly view of the threaded fitting of FIG. 2D used to attach to a 5-port manifold.

In other embodiments, the fittings 105, 115 may nest into each other, as depicted in FIG. 2C. The distance of nesting overlap 125 is the result of one fitting 105 having a protruding face seal surface and the other fitting 115 having concavity face surface. Also, the distance of nesting overlap 125 may be variable and is primarily determined on the level of vibration and flex expected on the coupling. For example, in applications with high level of vibration (e.g., installed in a jet engine bay), an overlap of 0.001-0.010"+ may be used to prevent adapter-to-adapter flexing which could break the seal formed by the face seal 130. Larger distances of overlap 125 will prevent flexing more effectively, though it comes at the cost of overall fitting length, ability to use a gland o-ring 120 on the nested fitting 105, and machining complexity. As like in other embodiments, the fitting adapters may have a face seal 130 and/or a gland o-ring(s) or seal 120.

Figure 3:
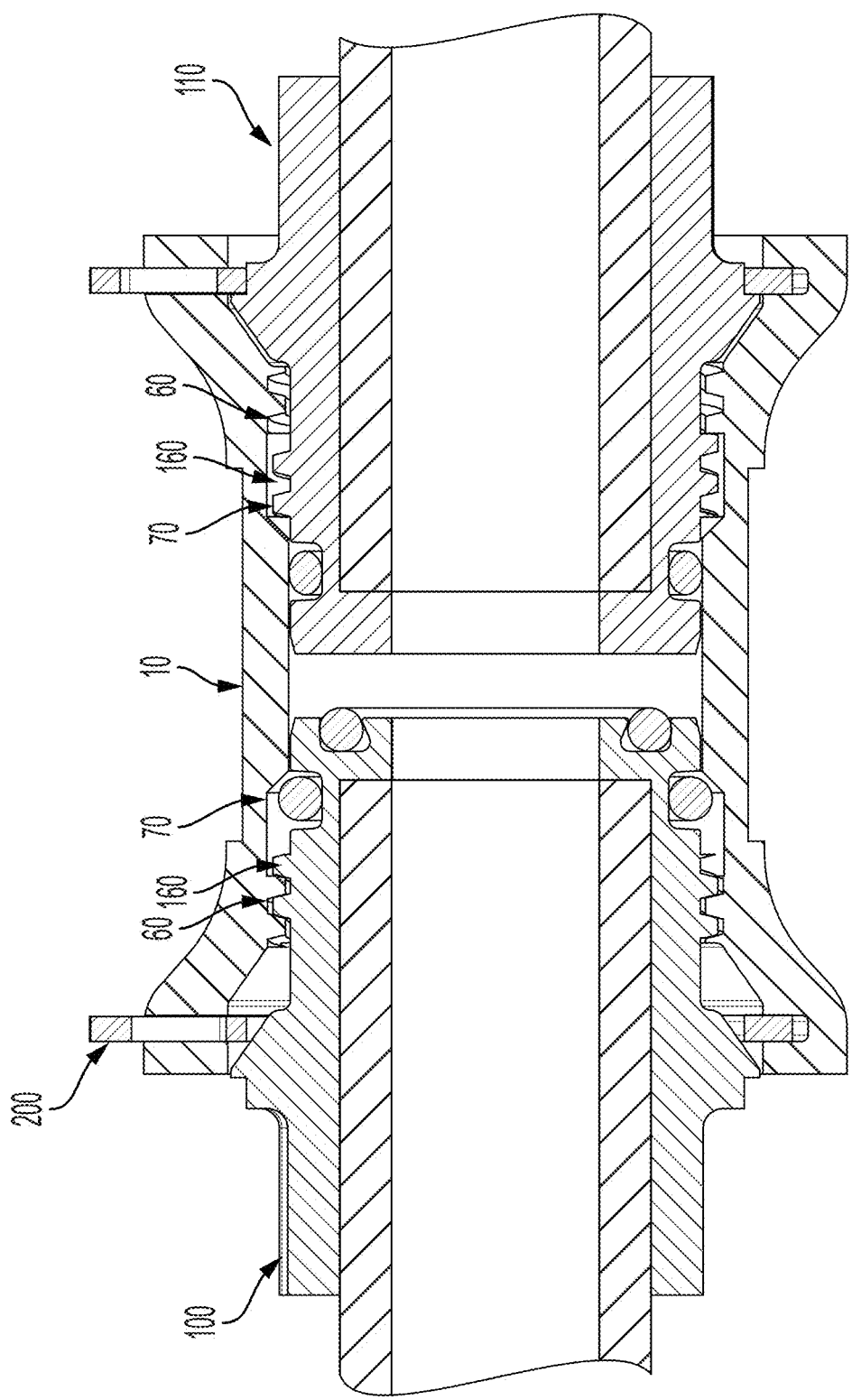
FIG. 3 shows a side half-section view of the one fitting fully seated into the coupling body, and one fitting partially seated into the coupling body. Two retaining rings are also seated into the coupling body.

FIG. 3 shows a cross-sectional view of the coupling body 10 with one fitting 110 fully inserted and locked and one fitting 100 partially inserted and, therefore, not locked. This view shows the locked fitting's 110 male threads 160 residing within the coupling body's 10 relief groove 70, and the coupling body's 10 female threading 60 positioned within the grip length or shank 165 of the fitting adapter 110. These two features in conjunction allow the coupler body 10 to free spin around one or both fitting adapters 100, 110 enabling installation where the tubes 170 or other fluid vessel are rigid and cannot be rotated to be coupled together.

Figure 4:
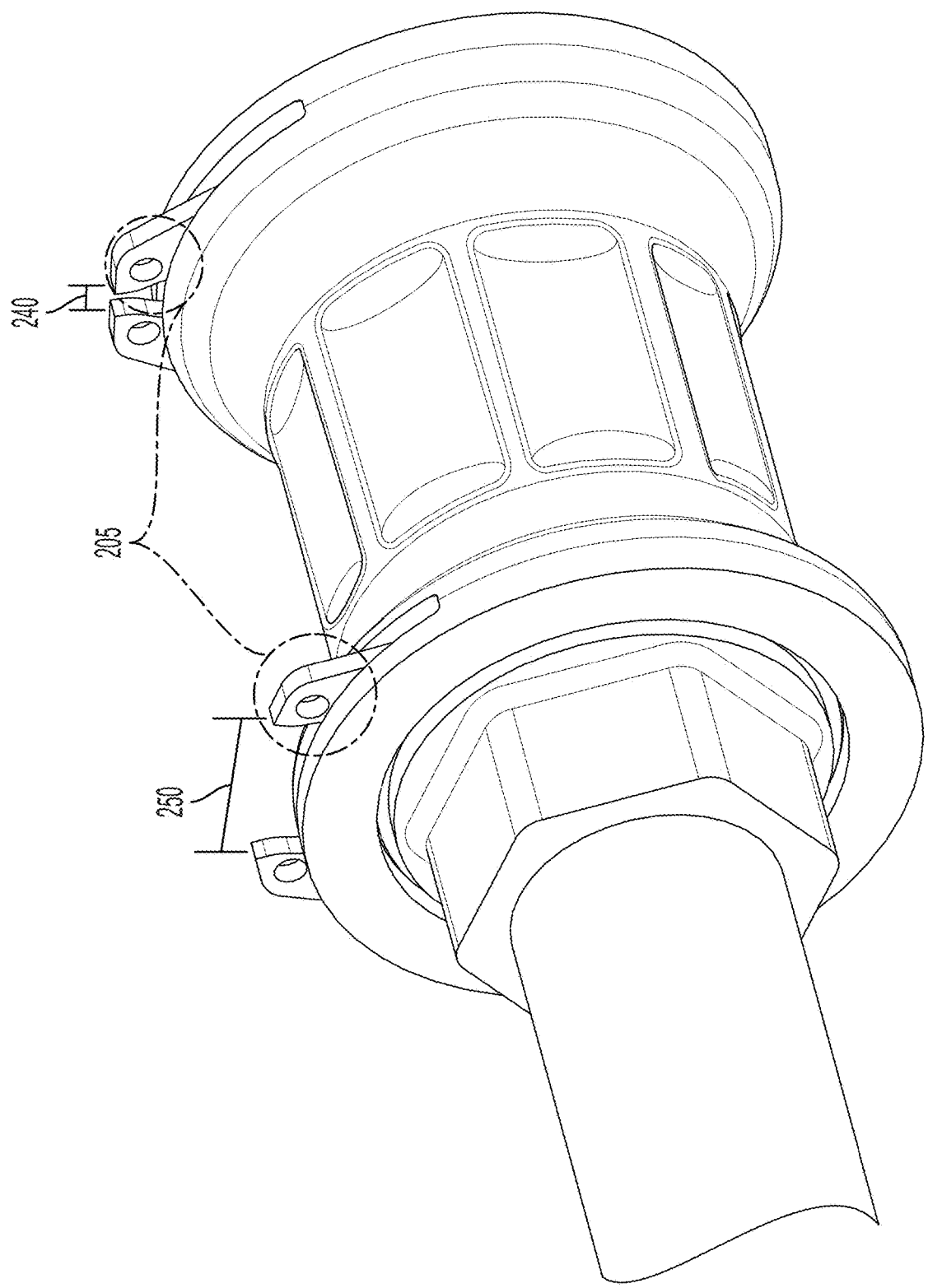
FIG. 4 shows an isometric view of a fitting fully seated into the coupling body with a retaining ring's lugs surrounding the fully inserted fitting are spread a set distance compared to the retaining ring without a fully inserted fitting which is in its normal position.

FIG. 4 shows an isometric view of FIG. 3 of the coupling body 10 with one fitting 100, 110 fully inserted and locked. Note the distance between the retaining ring's 200 lugs 205:240 (unlocked) and 250 (locked). On the side with a fitting 100, 110 fully inserted and locked, the distance 250 is greater than the distance 240 on the side without a fitting 100, 110; this serves as a positive engagement indicator for a technician to verify that the fitting adapter is fully seated. This indicator is designed to be visual or tactile for simplicity, but a distance gauge could be used to further, and more accurately, validate full engagement. The difference of distance between when unlocked 240 and locked 250 is variable, however the locked distance 250 must always be greater than the unlocked distance 240 to tension the retaining ring 200 and ensure even contact around the fitting 100, 110. An additional engagement indicator unique to this design is that the coupling body 10 can be freely rotated about the fittings 100, 110 when they are fully seated and locked.

Figure 5D:
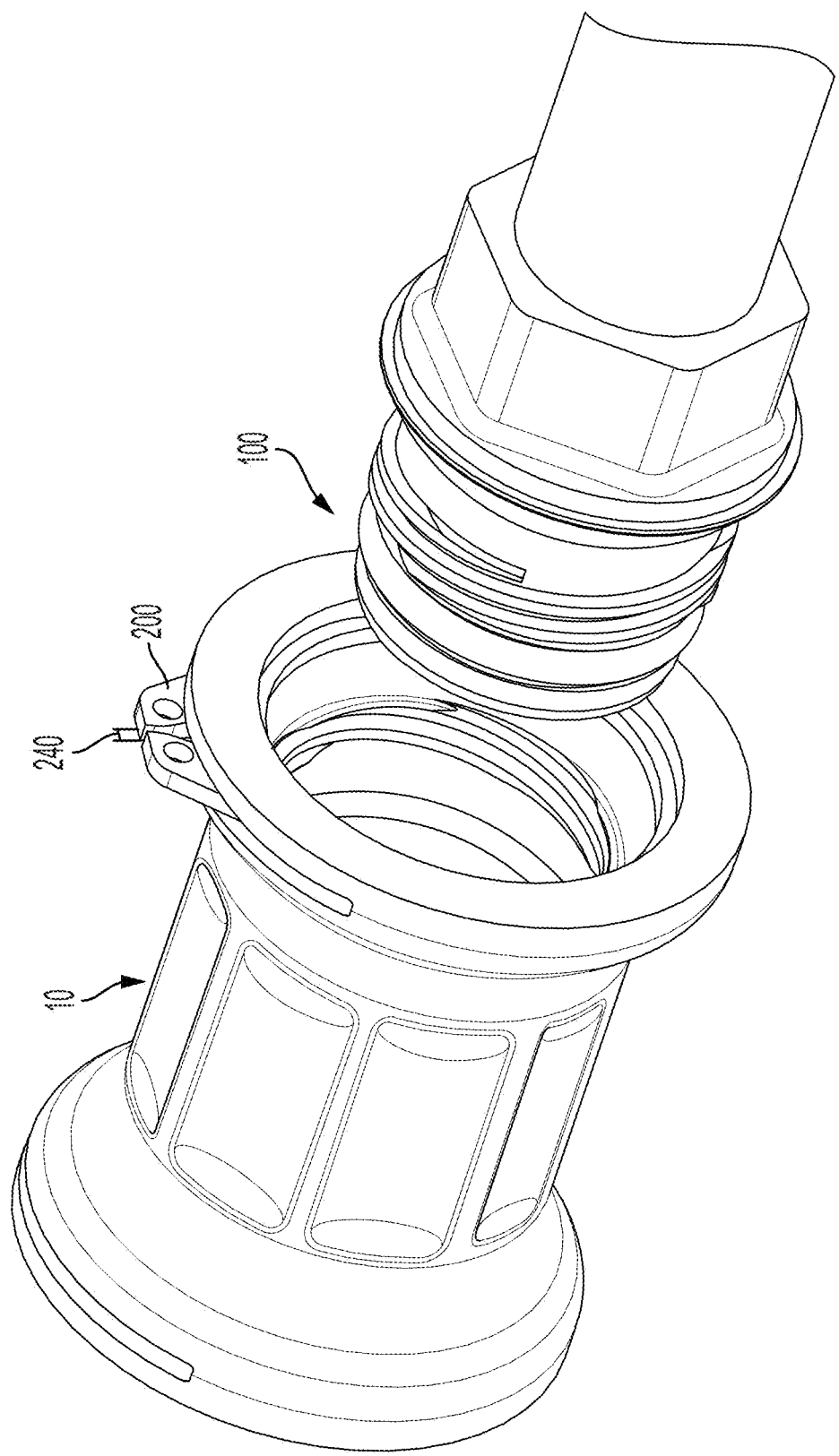
FIG. 5D shows an isometric view of the retaining ring and coupling body subassembly fully assembled with the fitting adapter being aligned for insertion.
Figure 5E:
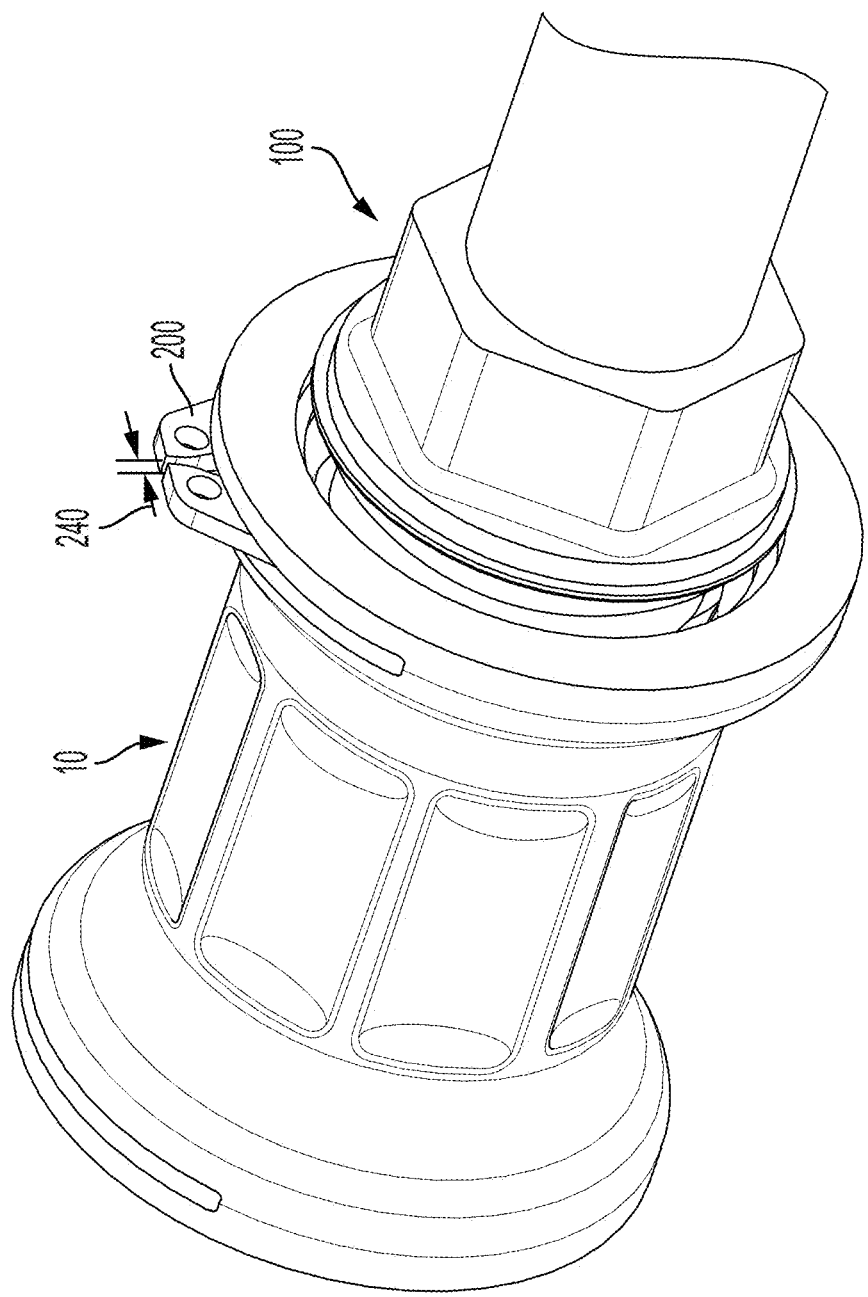
FIG. 5E shows an isometric view of the retaining ring and coupling body subassembly fully assembled with the fitting partially inserted to note the distance between the lugs of the retaining ring.
Figure 5F:
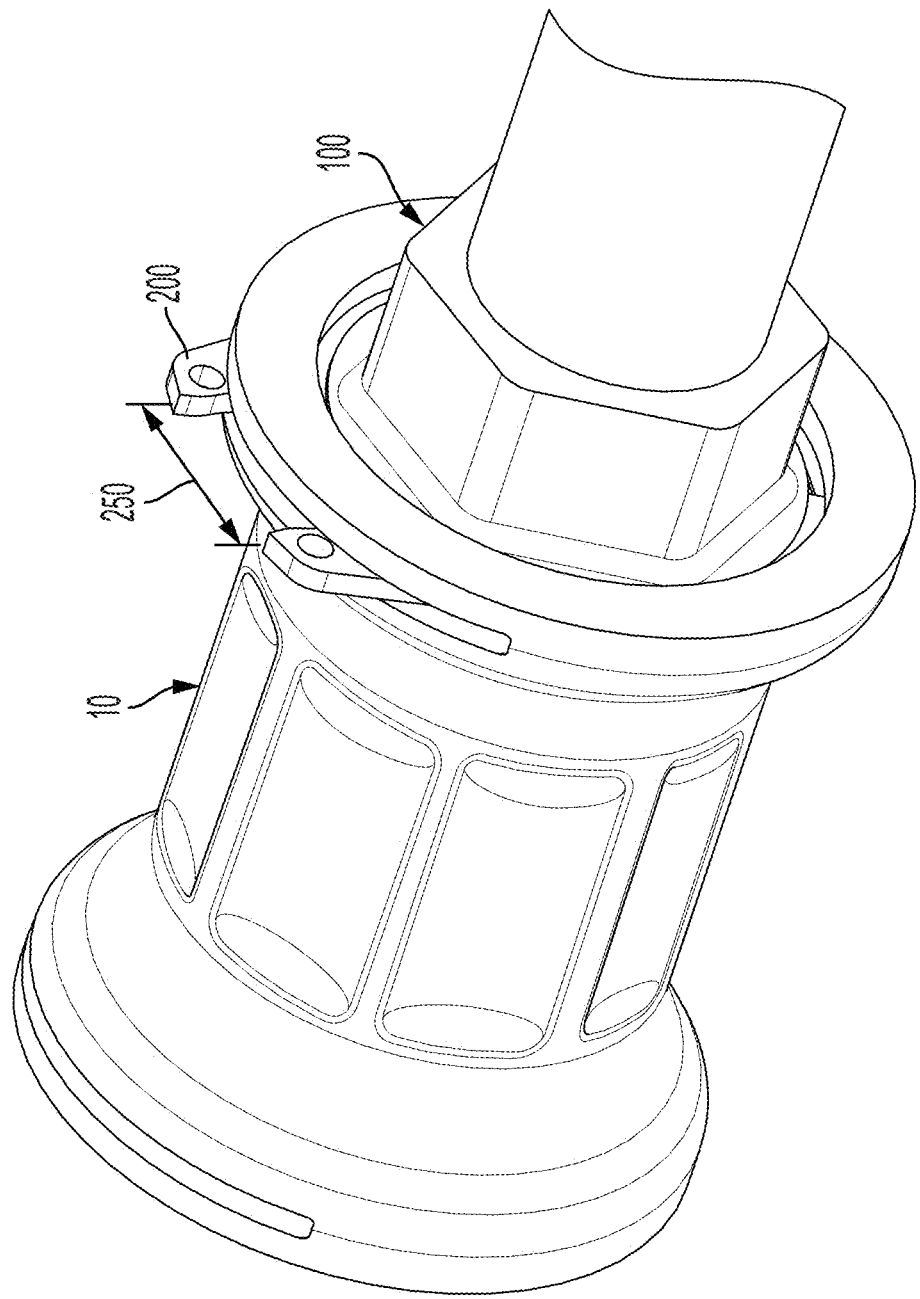
FIG. 5F shows an isometric view of the retaining ring and coupling body subassembly fully assembled with the fitting fully inserted to note the distance between the lugs of the retaining ring.

FIGS. 5A-F show the installation methodology for the disclosed implementation. FIG. 5A shows the insertion of the retaining ring 200 into the coupling body 10. The retaining ring 200 must be inserted into the coupling body 10 before fitting 100, 110 can be inserted into the coupling body 10. FIG. 5B shows the retaining ring 200 partially inserted into the coupling body 10 through the retaining ring slot 30 into the retaining ring groove 40. FIG. 5C shows the retaining ring 200 fully seated into the coupling body 10. FIG. 5D shows the insertion of the fitting adapter 100 into the coupling body 10 through the retaining ring 200. Note the nominal distance between the retaining ring's lugs 240. FIG. 5E shows the partial insertion of the fitting 100 into the coupling body 10 through the retaining ring 200. FIG. 5F shows the full insertion of the fitting 100 into the coupling body 10 through the retaining ring 200. Note that when the fitting 100 is inserted into the coupling body 10, the distance 250 between the retaining ring's lugs 240 increases, enabling the technician can verify full insertion by touch and not needing a direct line of sight full by the coupling body freely rotating around fittings 100, 110.

The implementation described is designed primarily for environments where installation is in an area where there is not a direct line of sight and/or where pressures and vibrations may be high. When pressurized, all axial force resulting from the pressure is applied against the retaining ring 200, preventing the fitting 100, 110 from backing out of the coupling body's threads 60 during high vibrational loading. Additionally, the fitting's 100, 110 coarse thread (i.e., less than 2 rotations to full insertion) 160 reduces cross-threading risks by ensuring the fitting 100, 110 is misaligned with the coupling body's 10 central axis significantly if cross-threading begins.

The requirements of the materials for the fittings 100, 110, coupling body 10, retaining ring 200, face seal 130, and gland o-ring 120 are dependent upon the specific application. For example, for applications with high pressures but minimizing weight is critical, the individual parts may be made of titanium due to its high strength to weight ratio. In contrast, for applications where cost and weight are a main concern, the individual parts may be made of aluminum which is cheaper than titanium while retaining a low density, at the cost of strength. Further, the fluid in use may drive material choice. For example, if hydrogen is being sealed, an austenitic stainless steel may be used to reduce the effect of hydrogen embrittlement. Other possible materials that may be used include Inconel, Stainless Steel, Carbon Steel, and Brass. In some embodiments, the fittings 100, 110 can be made of a different material than the coupling body 10, which may further be made of a different material than the retaining ring 200. For example, if both the coupling body 10 and fittings 100, 110 are made of uncoated titanium, galling may occur. To combat this, the titanium can be surface treated, or the fittings 100, 110 and coupling body 10 could be made of dissimilar materials that do not react with each other. In further embodiments, the fittings 100, 110 or coupling body 10 may be coated for additional corrosion resistance, compatibility with additional fluids, improved wear resistance, or lower surface friction. Similarly, the material and durometer of the face 130 and gland o-ring/seals 120 may vary based on the fluid pressure, fluid type, or thermal and vibrational environment. For example, these seals may be made of Nitrile/acrylonitrile butadiene rubber (Buna-N), Ethylene Propylene rubber/Ethylene Propylene Diene Monomer (EPR/EPDM), Fluoroclastomer/FKM (Viton), Silicone, Fluorosilicone, or Fluorocarbon.

The pitch of the thread 60, 160 may vary between implementations. Additionally, the threads 60, 160 may have a single-start or have multiple starts (as shown) depending on the environment the implementation is being deployed in; multi-start threads allow the fittings 100, 110 to begin threading into the coupling body 10 at more locations thereby reducing the average revolutions to fully tighten the fittings 100, 110, but they are typically more difficult and time consuming to fabricate and may increase the chances of cross-threading in some implementations. For example, for a 1" long, ½" diameter fittings 100, 110, that is designed to fully seat into the coupling body 10 within one fully rotation to confined spaces, a pitch of 0.04-0.05" may be used with a triple start design. The triple start design allows the fittings 100, 110 to engage the coupling body within 120 degrees rather than 360 degrees, further reducing the number of total rotations required to engage the fittings 100, 110 into the coupling body 10.

Through precise manufacturing, the coupling body 10 and retaining rings 200 arc designed to lock the fittings 100, 110 such that the face of each adapter 310 (FIG. 6C) is within 0.005" of each other when pressurized. This minimal face-to-face distance 310 enables the face seal (when present) 130 to seal working pressures of up to 5,000 psi in high thermal and vibration environments without the use of a backup ring to prevent extrusion. This minimal face-to-face distance can be further implemented to enable the face seal (when present) 130 to seal working pressures over 5,000 psi in high thermal and vibration environments without the use of a backup ring to prevent extrusion. Holding this tight tolerance will increase manufacturing costs when compared to a fitting with a looser tolerance, therefore, the present disclosure is primarily aimed at applications where the use of a backup ring adds installation complexity (e.g., blind installations where the backup ring can dislodge without a technician noticing), or otherwise is avoided.

Figure 6B:
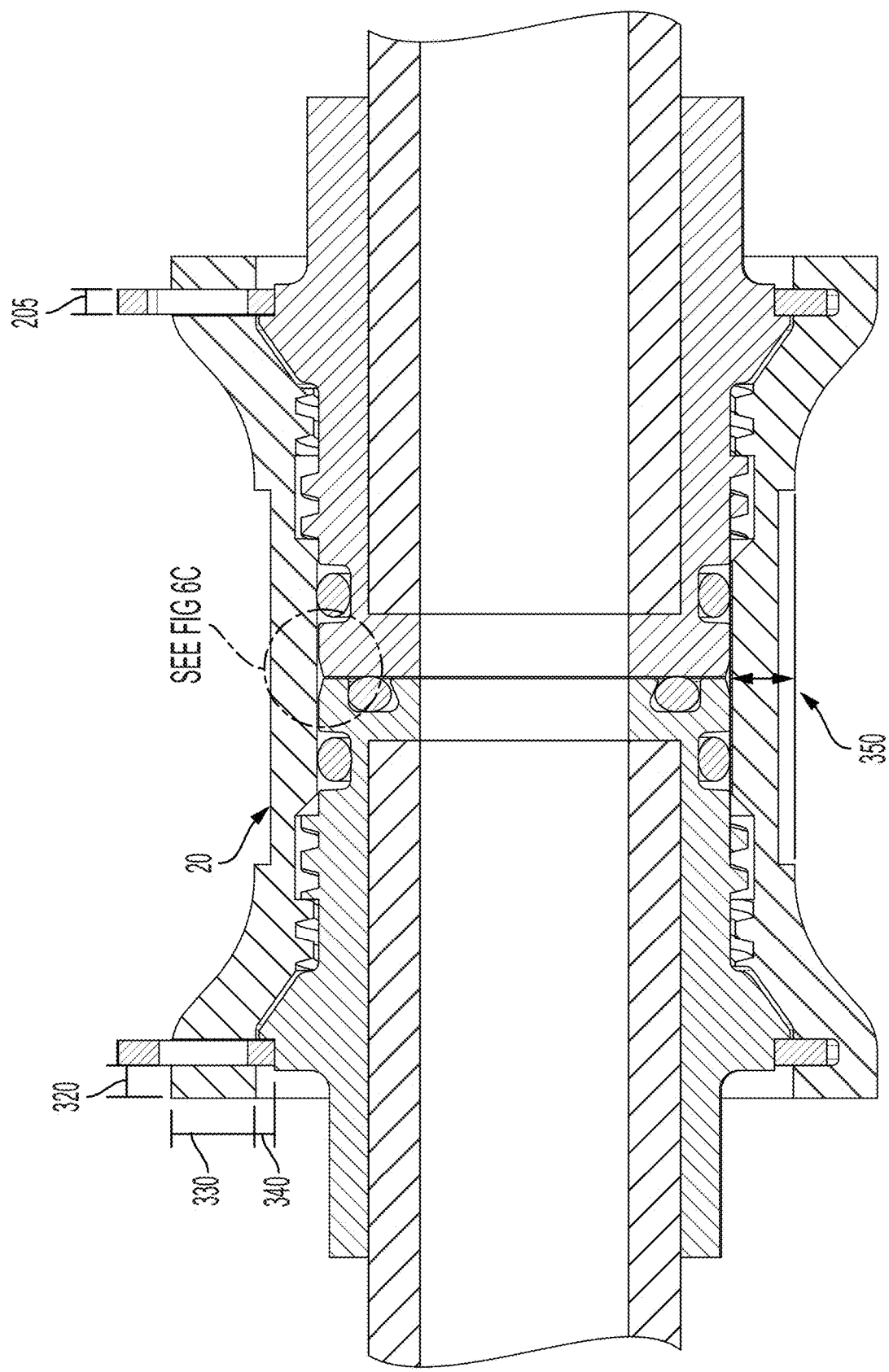
FIG. 6B shows a half section view of a 1,500 psig working pressure, weight and size minimized embodiment with flats for wrench tightening.

FIG. 6A shows one possible embodiment ('HP') of this disclosure applied to a ½" OD tube union for a 5,000 psig working pressure fluid in a high vibration, high temperature, and size and weight critical application. FIG. 6B shows another possible embodiment ('MP') of this disclosure applied to a ½" OD tube union for a 1,500 psig working pressure fluid in a high vibration, high temperature, and size and weight critical application. For both embodiments, the main critical features that define the pressure rating are shown as 205, 310 (shown in FIG. 6C), 320, 330, and 340.

Because the retaining ring 200 is held in pure shear between the shoulder 145 and the groove 40 when the coupling is pressurized, the retaining ring's thickness 205 (FIG. 6A), is dependent on the material's chosen shear strength and desired pressure rating of the coupling. In these two embodiments, we assumed a Ti-6Al-4V ('Grade 5 Titanium') retaining ring 200. In the HP embodiment, a 0.06" thick 205 retaining ring 200 is used, while the MP embodiment uses a 0.04" thick 205 retaining ring 200. The difference in thickness 205 for both embodiments is dependent solely on the pressure carrying rating of the fitting.

Figure 6C:
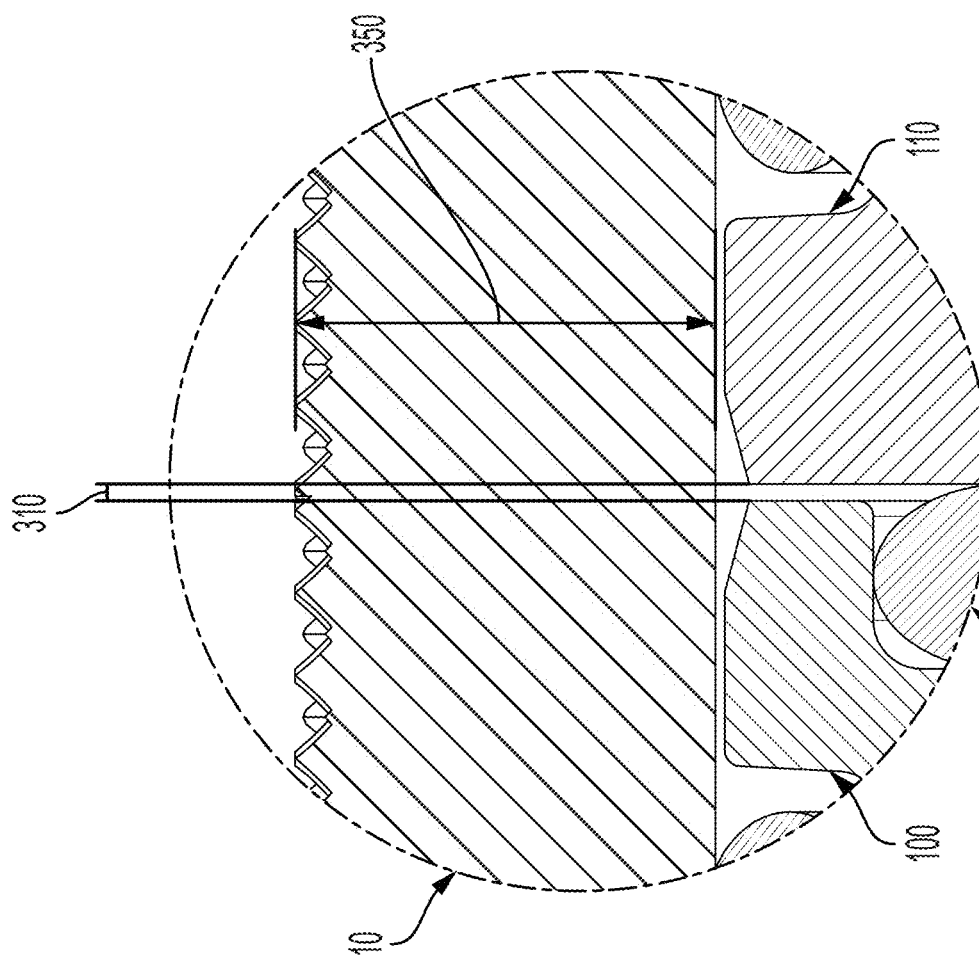
FIG. 6C shows a close-up of the half section view one embodiment, focusing on the distance between the fitting adapter's faces when fully seated into the coupling body.

As depicted in FIG. 6C, the two fittings 100, 110 having a distance 310 between the two faces when pressure is applied to the coupling body 10 and fitting 100, 110. The distance 310 is designed to not exceed 0.005" to enable the sole use of a face seal for working pressures of up to 5,000 psi without a backup ring.

As depicted in FIG. 6B, the thickness of the coupling body 10 that is directly behind, and supporting, the retaining ring 200 is identified as 320 in FIG. 6B. The thickness 320 varies with pressure carrying rating, diameter of tube, material of both the retaining ring 200 and coupling body 10, the thickness of the retaining ring, and the factor of safety desired for the application. In the HP and MP ½" titanium embodiments, FIG. 6A and FIG. 6B, respectively, the thickness 320 is 0.11" and 0.05", respectively. As these embodiments are made of the same material, this difference in thickness 320 is due to the larger pressure carrying capability of the HP embodiment. In these implementations, this thickness 320 was computationally determined with finite element analysis techniques assuming a 300° F. environment, worst-case scenario (i.e., assuming the face seal 130 has failed and assuming that the threading 60, 160 do not hold any of the load) loading. However, there is nothing in the configuration of the invention that would limit thickness 320, and, therefore, the thickness may vary to optimize the size and weight of the coupling body for specific applications. In physical experimentation, a MP ½" titanium assembly with a thickness 320 value of 0.05" held up to 10,500 psi with a face seal 130 and gland o-rings 120, and held up to 7,850 psi without a face seal 130 and only gland o-rings 120 in a static, room-temperature test.

As depicted in FIG. 6B, reference numeral 330 is the thickness defined as the outer diameter of the coupling body 10 and the inner diameter of the body wherein the fitting adapter 100, 110 freely passes through is identified as 330 in FIG. 6B. Similar to 320, the thickness 330 varies with pressure carrying rating, diameter of tube, material of both the retaining ring 200 and coupling body 10, the thickness 205 of the retaining ring 200, and the factor of safety desired for the application. In the HP and MP ½" titanium embodiments, FIG. 6A and FIG. 6B, respectively, the thickness 330 is 0.25" and 0.14", respectively. In these implementations, this thickness 330 was coupled with the thickness 320 and computationally determined with finite element analysis techniques assuming a 300° F. environment, worst-case scenario (i.e., assuming the face seal 130 has failed and assuming that the threading 60, 160 do not hold any of the load) loading. However, there is nothing in the configuration of the invention that would limit thickness 330, and, therefore, the thickness may vary to optimize size, weight, machinability, and overall ergonomics of the coupling body for specific applications. In physical experimentation, a MP ½" titanium assembly with a thickness 330 value of 0.14" held up to 10,500 psi with a face seal 130 and gland o-rings 120, and held up to 7,850 psi without a face seal 130 and only gland o-rings 120 in a static, room-temperature test.

As depicted in FIG. 6B, the distance between the locking diameter 150 and the bottom of the 330 thickness dimension (the coupling body 10 inner diameter) is identified as distance 340 in FIG. 6B. Defined in terms of the fitting adapter 100, 110, the distance 340 is between the locking diameter 150 and the retaining ring ramp ledge 145 plus a manufacturing tolerance (typically about 0.005"). The distance 340 minus the manufacturing tolerance is the only area that the fittings 100, 110 contact the retaining ring 200, and is therefore critical as the entire axial force produced by the internal pressure acting against the fitting's 100, 110 face is applied against this area. This distance 340 is dependent on the pressure carrying rating, diameter of the tube, material of the retaining ring 200 and fitting adapters 100, 110, the thickness of the retaining ring 200, and the manufacturing tolerance used. In the HP and MP ½" titanium embodiments, FIG. 6A and FIG. 6B, respectively, this distance 340 is 0.05" and 0.03", respectively. In these implementations, this distance 340 was coupled with the thicknesses 320 and 330 and computationally determined with finite element analysis techniques assuming a 300° F. environment, worst-case scenario (i.e., assuming the face seal 130 has failed and assuming that the threading 60, 160 do not hold any of the load) loading. However, there is nothing in the configuration of the invention that would limit distance 340, and, therefore, the distance may vary to optimize size, weight, and machinability of the coupling body for specific applications. In physical experimentation, a MP ½" titanium assembly with a distance 340 value of 0.03" held up to 10,500 psi with a face seal 130 and gland o-rings 120, and held up to 7,850 psi without a face seal 130 and only gland o-rings 120 in a static, room-temperature test.

Figure 1D:
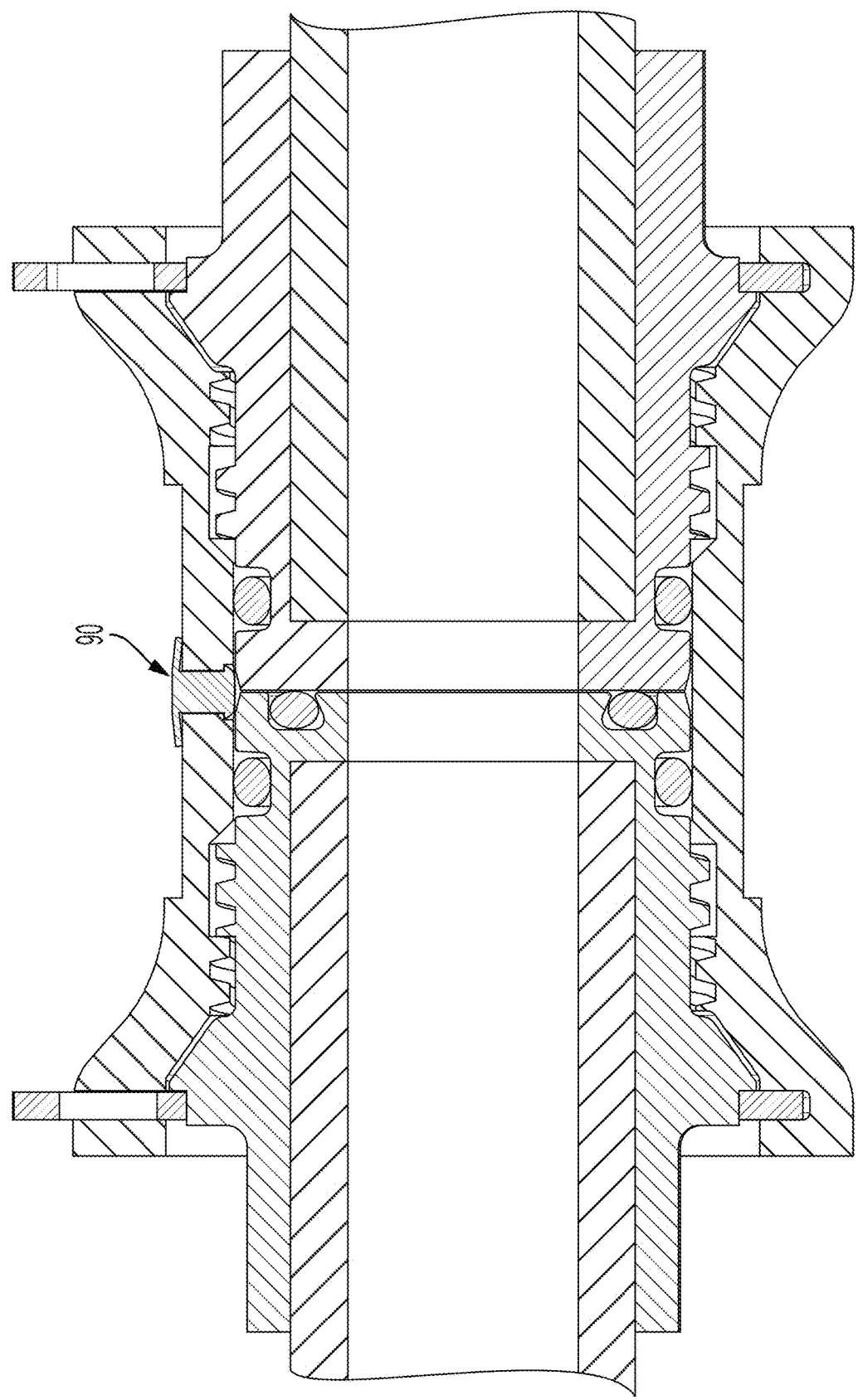
FIG. 1D shows a side half-section view of the coupling body with an elastomeric pressure relief valve (PRV) installed.

As depicted in FIG. 6B, the thickness of the center section of the coupling body 10 is identified as 350 in FIG. 6B. If a face seal 130 is present, and the pressures are such that a face seal 130 failure is not anticipated, this thickness can be minimized to save weight as the pressure would be contained within the fitting adapters 100, 110. Additionally, a PRV 90, as depicted in FIG. 1D, can be used to ensure the coupling body 10 does not experience the internal pressure without a ventilation route to prevent fracture of the coupling body 10. In the depicted embodiments, we use seals or gland o-rings 120 that act as secondary seals should the face seal 130 fail. Therefore, in these embodiments, the coupling body 10 may experience the internal pressure and would need to retain that pressure without deformation to ensure the seals or gland o-rings 120 contain the fluid. Therefore, in these embodiments, the thickness 350 is critical, but may change with pressure carrying rating and coupling body 10 material. In the HP and MP ½" titanium embodiments, FIG. 6A and FIG. 6B, respectively, the preferred embodiment for the thickness 350 is 0.14" and 0.10", respectively. This thickness 350 was determined with finite element analysis techniques assuming a 300° F. environment, worst-case scenario (i.e., assuming the face seal 130 has failed and assuming that the threading 60, 160 do not hold any of the load) loading. However, there is nothing in the configuration of the invention that would limit thickness 350, and, therefore, the thickness may vary to optimize size, weight, machinability, and overall ergonomics of the coupling body for specific applications. In physical experimentation, a MP ½" titanium assembly with a thickness value 350 of 0.10" held up to 10,500 psi with a face seal 130 and gland o-rings 120, and held up to 7,850 psi without a face seal 130 and only gland o-rings 120 in a static, room-temperature test.

While we have shown and described several implementations in accordance with the disclosure, it should be understood that the same is susceptible to further changes and modifications without departing from the scope of the disclosure. Therefore, we do not want to be limited to the details shown and described herein but intend to cover all such changes and modifications as are encompassed by the scope of the appended claims.

What is claimed is:

1. A fluid coupler for containing at least one retaining ring having an outer ring diameter, an inner ring diameter, and a pair of lugs to provide an indicator as to positive engagement, the fluid coupler comprising:
   a coupling body having an external surface with opposing ends and having at least one slot having a length to allow the retaining ring to pass through the at least one slot and the at least slot is located near the at least one opposing end and an internal surface opposing the external surface and having at least one groove congruent with the at least one slot and for receiving the outer diameter of the retaining ring and a threaded section; and a fitting having a shank having a diameter less than the inner diameter of the retaining ring, a ramp shaped as a conical frustum having a first ramp diameter less than the inner diameter of the retaining ring and a second ramp diameter greater than the inner diameter of the retaining ring, and a cylindrical retaining seat having a diameter less than the second ramp diameter, wherein the coupling body ends with opposing flanges positioned on the opposing ends.

2. The fluid coupler of claim 1, wherein the coupling body has at least one flat surface or a knurling along the external surface.

3. A fluid coupler for containing at least one retaining ring having an outer ring diameter, an inner ring diameter, and a pair of lugs to provide an indicator as to positive engagement, the fluid coupler comprising:

a coupling body having an external surface with opposing ends and having at least one slot having a length to allow the retaining ring to pass through the at least one slot and the at least slot is located near the at least one opposing end and an internal surface opposing the external surface and having at least one groove congruent with the at least one slot and for receiving the outer diameter of the retaining ring and a threaded section; and a fitting having a shank having a diameter less than the inner diameter of the retaining ring, a ramp shaped as a conical frustum having a first ramp diameter less than the inner diameter of the retaining ring and a second ramp diameter greater than the inner diameter of the retaining ring, and a cylindrical retaining seat having a diameter less than the second ramp diameter, wherein the internal surface further comprises at least one first conical frustum adjacent the at least one groove congruent with the at least one slot and the at least one first conical frustum tapering toward the threaded section having a major diameter and adjacent the threaded section is a relief groove having a diameter larger than the major diameter of the threaded section and at least one second conical frustum tapering toward a sealing section.

4. The fluid coupler of claim 3, further comprising the at least one second conical frustum adjacent the relief groove.

5. The fluid coupler of claim 4, wherein the sealing section is cylindrical in shape.

6. A fluid coupler for containing at least one retaining ring having an outer ring diameter, an inner ring diameter, and a pair of lugs to provide an indicator as to positive engagement, the fluid coupler comprising:

a coupling body having an external surface with opposing ends and having at least one slot having a length to allow the retaining ring to pass through the at least one slot and the at least slot is located near the at least one opposing end and an internal surface opposing the external surface and having at least one groove congruent with the at least one slot and for receiving the outer diameter of the retaining ring and a threaded section; and a fitting having a shank having a diameter less than the inner diameter of the retaining ring, a ramp shaped as a conical frustum having a first ramp diameter less than the inner diameter of the retaining ring and a second ramp diameter greater than the inner diameter of the retaining ring, and a cylindrical retaining seat having a diameter less than the second ramp diameter, wherein the fitting further comprising a face seal surface at a first end of the fitting.

7. The fluid coupler of claim 6, wherein between the face seal and the shank is threading.

8. The fluid coupler of claim 7, wherein the face seal surface contains a groove for a seal.

9. The fluid coupler of claim 8, wherein the threading permits the fitting to be threaded into the coupling body.

10. The fluid coupler of claim 7, wherein between the face seal and the threading is a cylindrical surface.

11. The fluid coupler of claim 10, wherein the cylindrical surface contains a groove of a seal.

12. A method of assembling a fluid coupler having a positive engagement indication, the method comprising:

providing a retaining ring having an outer diameter, inner diameter, and a pair of lugs;

providing a coupling body having an external surface with opposing ends and having at least one slot having a length to allow the retaining ring to pass through the at least one slot and the at least one slot is located near the at least one opposing end and an internal surface opposing the external surface and having at least one groove congruent with the at least one slot and for receiving the outer diameter of the retaining ring and a threaded section, and a relieve groove spaced from the at least one slot;

providing a fitting having a shank having a diameter less than the inner diameter of the retaining ring, a ramp shaped as a conical frustum having a first ramp diameter less than the inner diameter of the retaining ring and a second ramp diameter greater than the inner diameter of the retaining ring, and a cylindrical retaining seat having a diameter less than the second ramp diameter, a face seal surface at a first end of the fitting, and between the face seal and the shank is threading;

inserting the retaining ring through the at least one slot and into the at least one congruent groove;

inserting the fitting into the coupling body by threading the fitting and coupling body together with the threaded section on the coupling body and the threading on the fitting;

rotating at least one of the fitting and the coupling body such that the lugs expand as the inner diameter of the retaining ring traverses the ramp;

continuing to rotate at least one of the fitting and the coupling body until the thread section is in the relieve groove and the distance between the pair of lugs is less than the distance of the lugs when the inner diameter of the retaining ring was traversing the ramp; and whereby upon the threading of the fitting being in the relieve groove, the coupling body is free to spin around the fitting and the fitting is free to spin around the coupling body.

* * * * *